March 24, 1964   C. BRANDON ETAL   3,126,473
CONTROL APPARATUS FOR PROJECTILE LAUNCHING
Filed Sept. 16, 1954   21 Sheets-Sheet 1

INVENTORS
CHESTER BRANDON
BY ALVIN R. PIATT
ATTORNEY

INVENTORS
CHESTER BRANDON
BY ALVIN R. PIATT

ATTORNEY

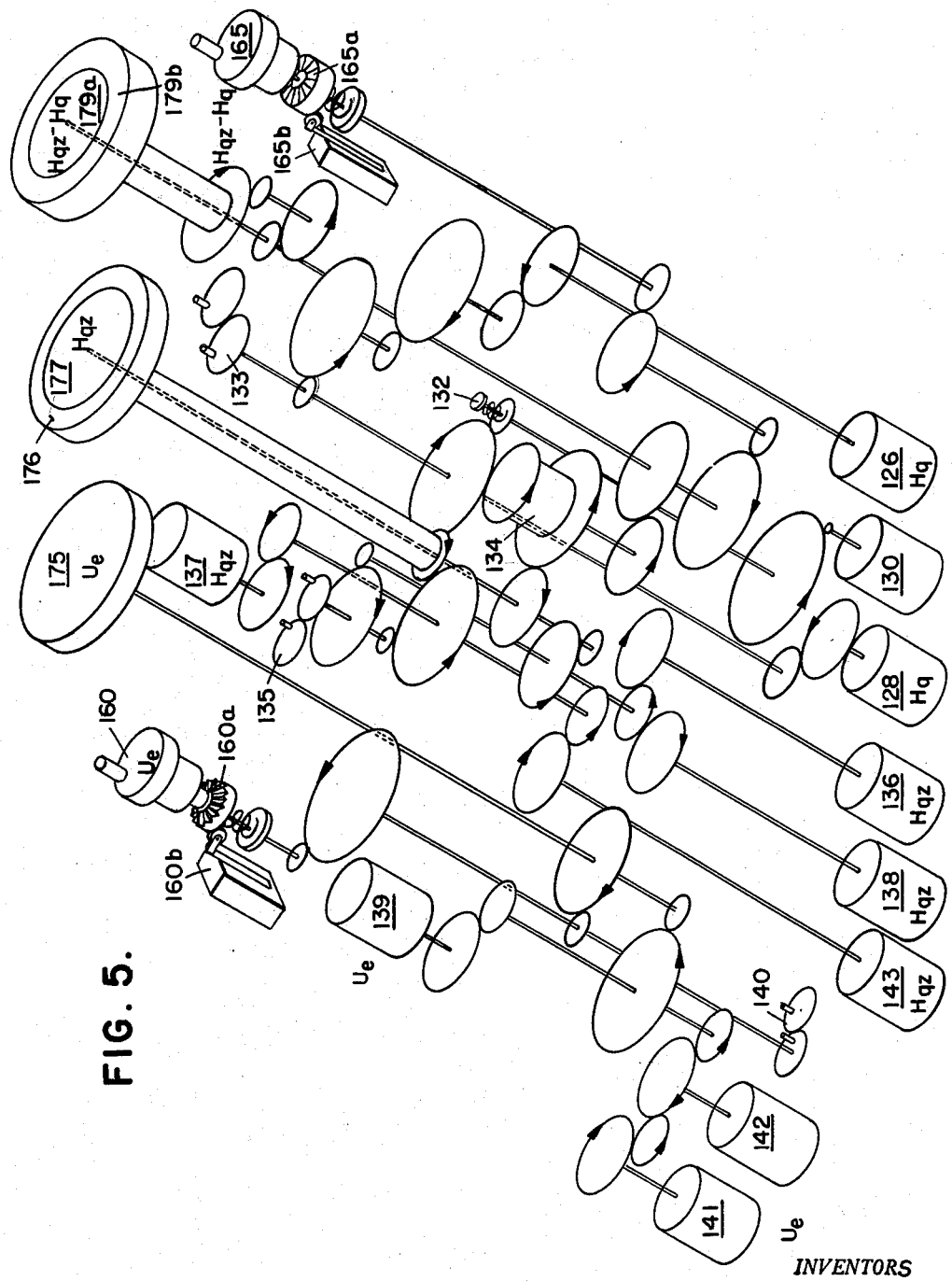

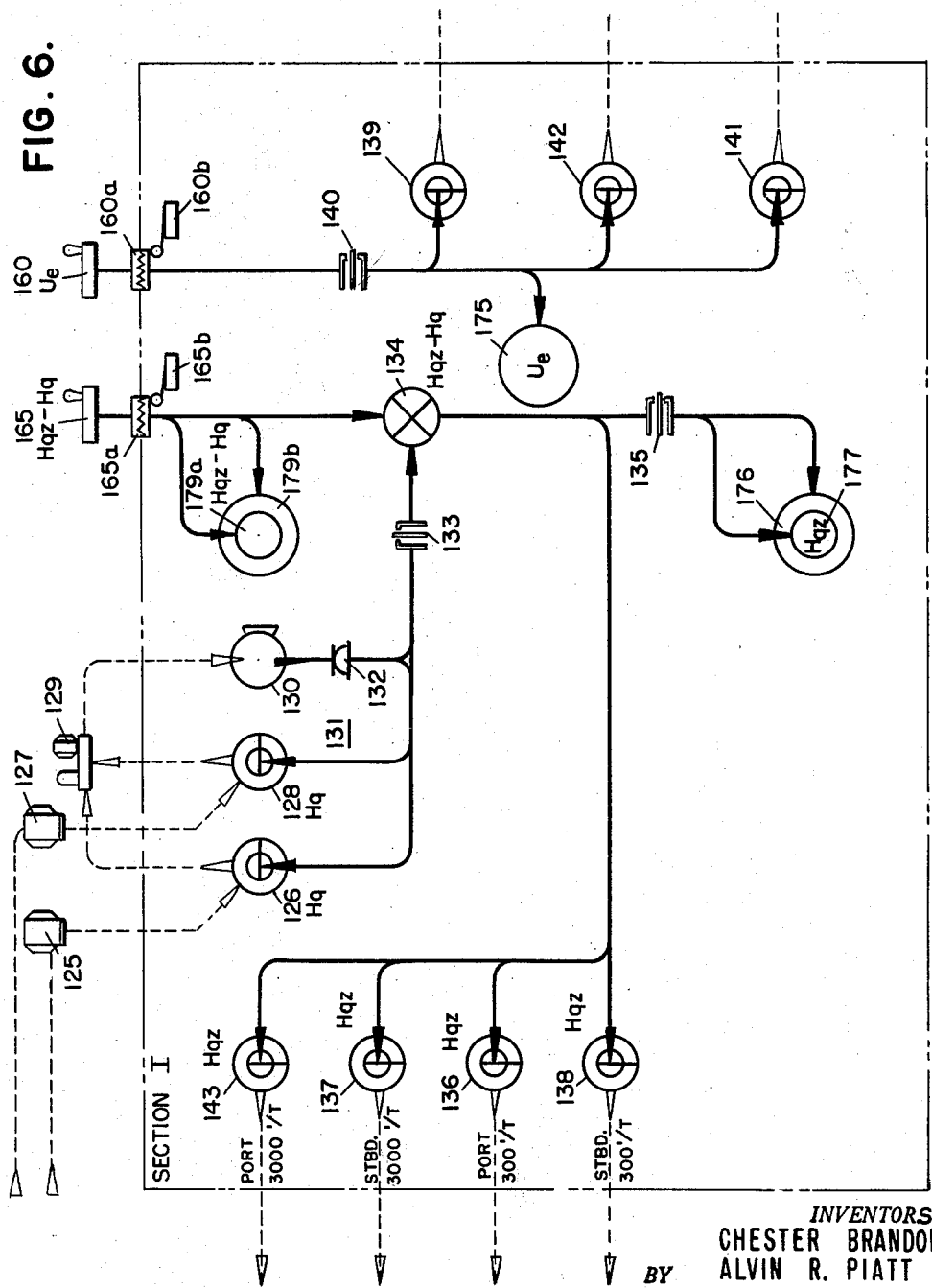

March 24, 1964  C. BRANDON ETAL  3,126,473
CONTROL APPARATUS FOR PROJECTILE LAUNCHING
Filed Sept. 16, 1954  21 Sheets-Sheet 7

INVENTORS
CHESTER BRANDON
BY ALVIN R. PIATT

ATTORNEY

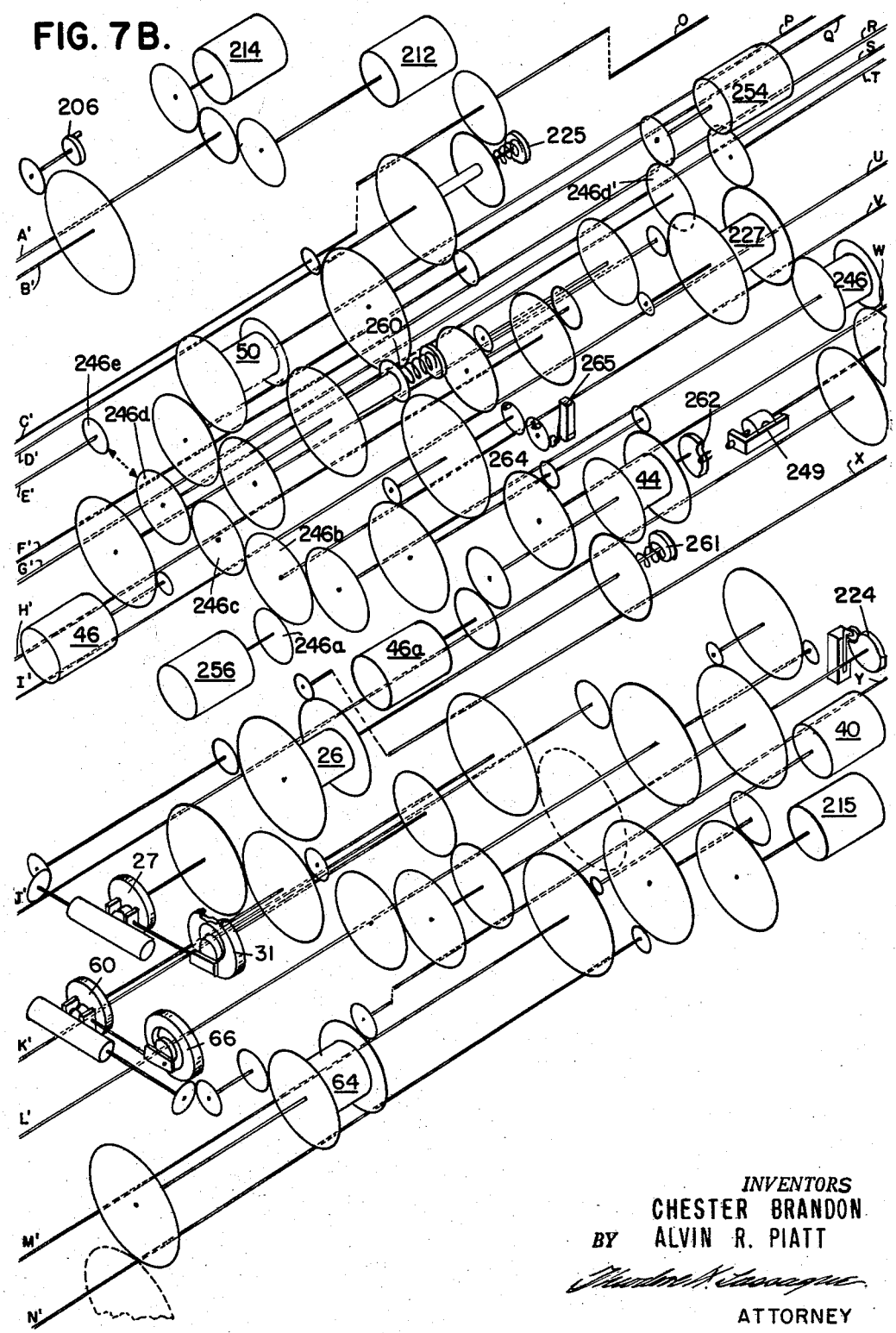

March 24, 1964  C. BRANDON ETAL  3,126,473
CONTROL APPARATUS FOR PROJECTILE LAUNCHING
Filed Sept. 16, 1954  21 Sheets-Sheet 9

INVENTORS
CHESTER BRANDON
BY ALVIN R. PIATT
ATTORNEY

March 24, 1964

C. BRANDON ETAL 3,126,473

CONTROL APPARATUS FOR PROJECTILE LAUNCHING

Filed Sept. 16, 1954

SECTION II
Part I.

*INVENTORS*
CHESTER BRANDON
ALVIN R. PIATT
BY

ATTORNEY

March 24, 1964   C. BRANDON ETAL   3,126,473
CONTROL APPARATUS FOR PROJECTILE LAUNCHING
Filed Sept. 16, 1954   21 Sheets-Sheet 11

INVENTORS
CHESTER BRANDON
BY ALVIN R. PIATT

ATTORNEY

March 24, 1964 C. BRANDON ETAL 3,126,473
CONTROL APPARATUS FOR PROJECTILE LAUNCHING
Filed Sept. 16, 1954 21 Sheets-Sheet 12

INVENTORS
CHESTER BRANDON
BY ALVIN R. PIATT
ATTORNEY

March 24, 1964  C. BRANDON ETAL  3,126,473
CONTROL APPARATUS FOR PROJECTILE LAUNCHING
Filed Sept. 16, 1954  21 Sheets-Sheet 13

INVENTORS
CHESTER BRANDON
BY ALVIN R. PIATT

ATTORNEY

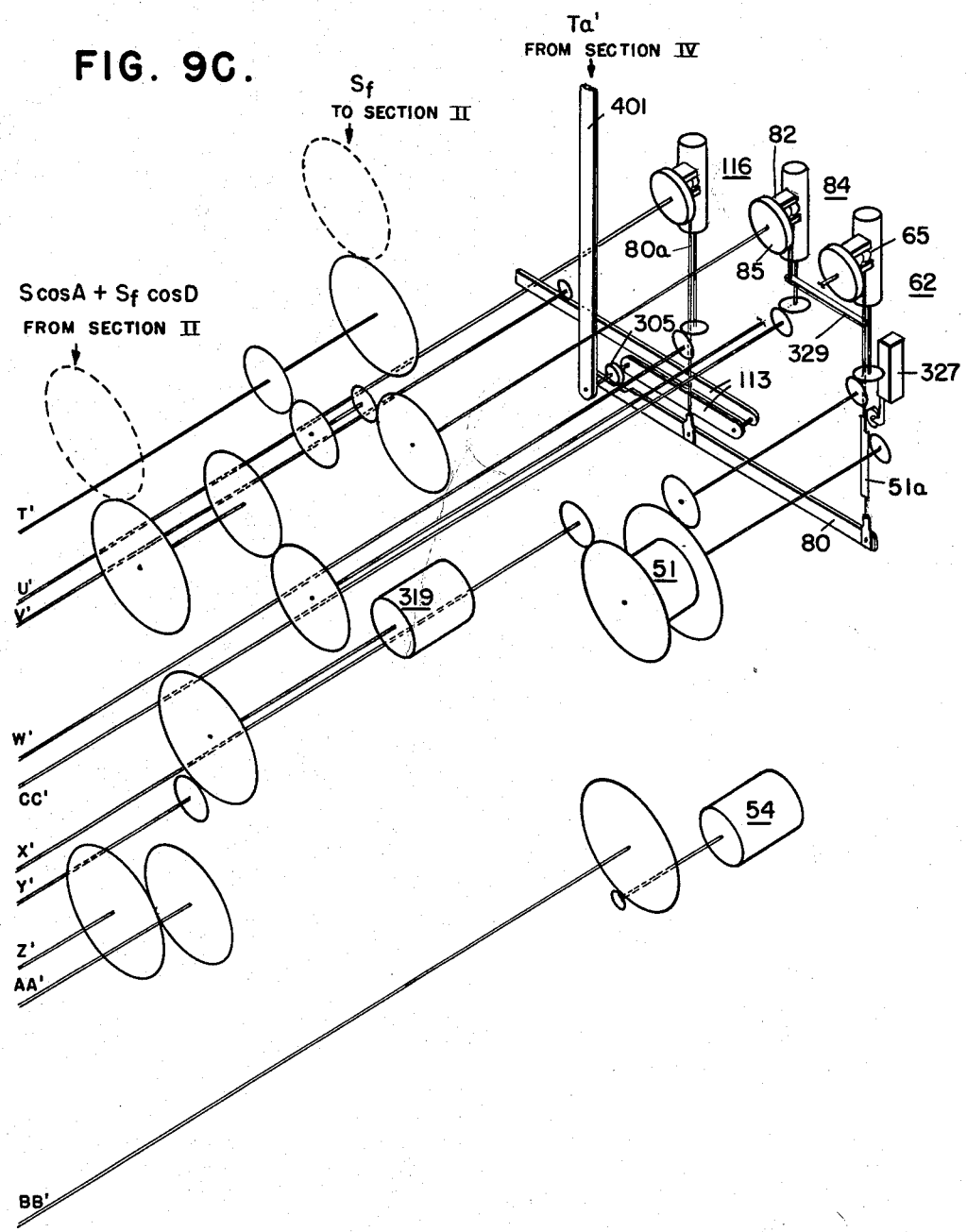

March 24, 1964 C. BRANDON ETAL 3,126,473
CONTROL APPARATUS FOR PROJECTILE LAUNCHING
Filed Sept. 16, 1954 21 Sheets-Sheet 15

INVENTORS
CHESTER BRANDON
BY ALVIN R. PIATT

ATTORNEY

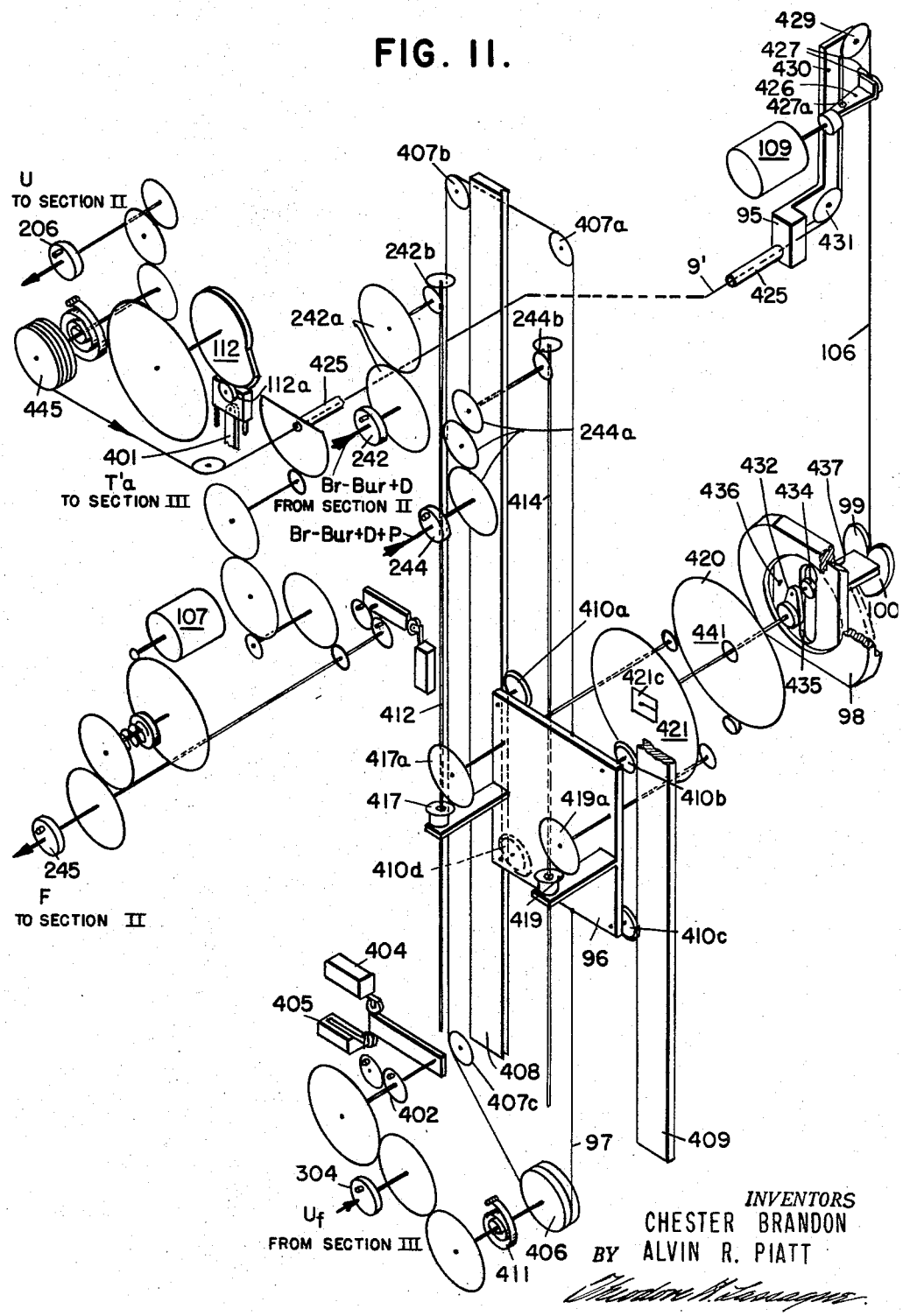

March 24, 1964   C. BRANDON ETAL   3,126,473
CONTROL APPARATUS FOR PROJECTILE LAUNCHING
Filed Sept. 16, 1954   21 Sheets-Sheet 17

INVENTORS
CHESTER BRANDON
BY ALVIN R. PIATT

ATTORNEY

INVENTORS
CHESTER BRANDON
ALVIN R. PIATT
BY
ATTORNEY

March 24, 1964 C. BRANDON ETAL 3,126,473
CONTROL APPARATUS FOR PROJECTILE LAUNCHING
Filed Sept. 16, 1954 21 Sheets-Sheet 21

INVENTORS
CHESTER BRANDON
BY ALVIN R. PIATT

ATTORNEY

United States Patent Office 3,126,473
Patented Mar. 24, 1964

3,126,473
CONTROL APPARATUS FOR PROJECTILE LAUNCHING
Chester Brandon, La Canada, and Alvin R. Piatt, Burbank, Calif., assignors to General Precision Inc., a corporation of Delaware
Filed Sept. 16, 1954, Ser. No. 456,520
28 Claims. (Cl. 235—61.5)

This invention relates to fire control control equipment, and particularly to means for computing factors involved in directing a torpedo attack by a surface vessel against a submersible target.

In naval operations against hostile submarines, one common method of attack is through the use of torpedoes fired from deck mounts on a destroyer or other surface vessel. Such deck mounts are secured at a fixed angle to the longitudinal axis of the attacking vessel, or own ship. The torpedoes are initially fired horizontally through the air in a fixed direction away from own ship's path. On entering the water, control is taken over by steering mechanisms contained in the torpedo which direct it along a pre-calculated course. This course is set into the torpedo steering mechanism electrically before the torpedo is discharged from the deck mount. The proper course and run are obtained by means of the invention to be described hereafter.

In order to calculate the course, the computer receives electrical input signals from other equipment carried by own ship as to the present range, bearing, speed and angle of the target.

It combines various known quantities with this information to determine the run, run time, lead angle and torpedo gyro angle necessary to carry out a successful attack. Other factors are used or computed during the process, such as the distance from the sighting point to the future position of the target, a hypothetical torpedo speed, the impact angle, the relative torpedo tube train angle and the torpedo run, as will be explained later.

The computations are carried out with the aid of a novel analog arrangement which simulates the actual path of the torpedo to scale mechanically, and solves the problems by measuring the angular and linear displacements required in bringing the mechanical system into balance. The solutions thus obtained are compared with computed values obtained elsewhere in the instrument, and differences are used to correct successively the magnitudes of the various factors utilized throughout the solution process. This process is continued until the results obtained by both methods are the same, at which point the correct values for all the unknown factors may be presumed to have been found.

This information is then used to pre-seat the gyroscopic equipment which controls the course of the torpedo, so that after it has been fired, it will turn through the proper angle, and then travel on the shortest possible straight course to intercept the target at the explosion point.

The invention may be better understood with the aid of the drawings, in which:

FIGURE 5 is an exploded schematic view of the elements employed in Section I of the computer.

FIGURE 6 is a schematic functional diagram of the mechanism of Section I of the computer.

Figure 7A:
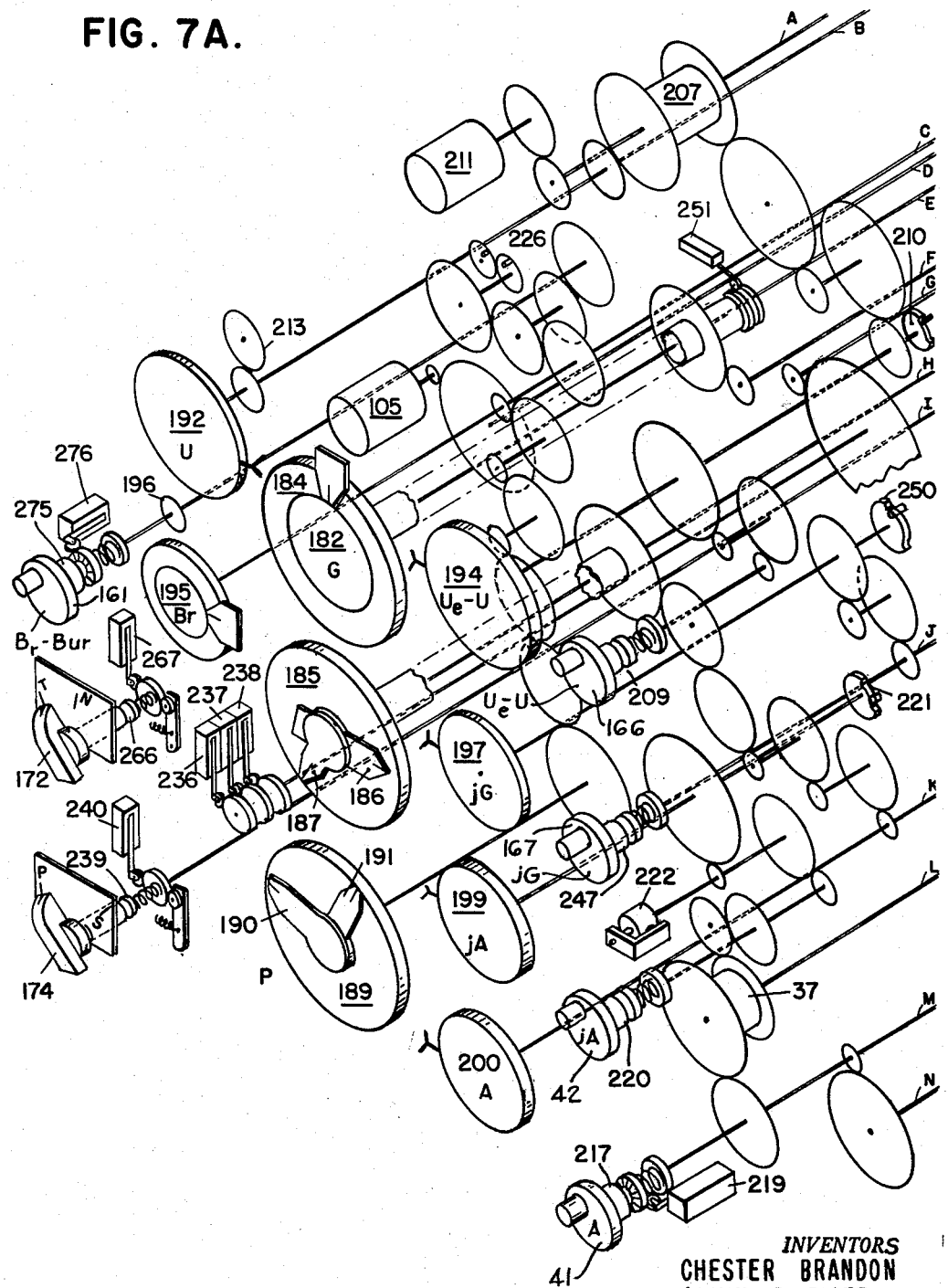
Figure 7C:
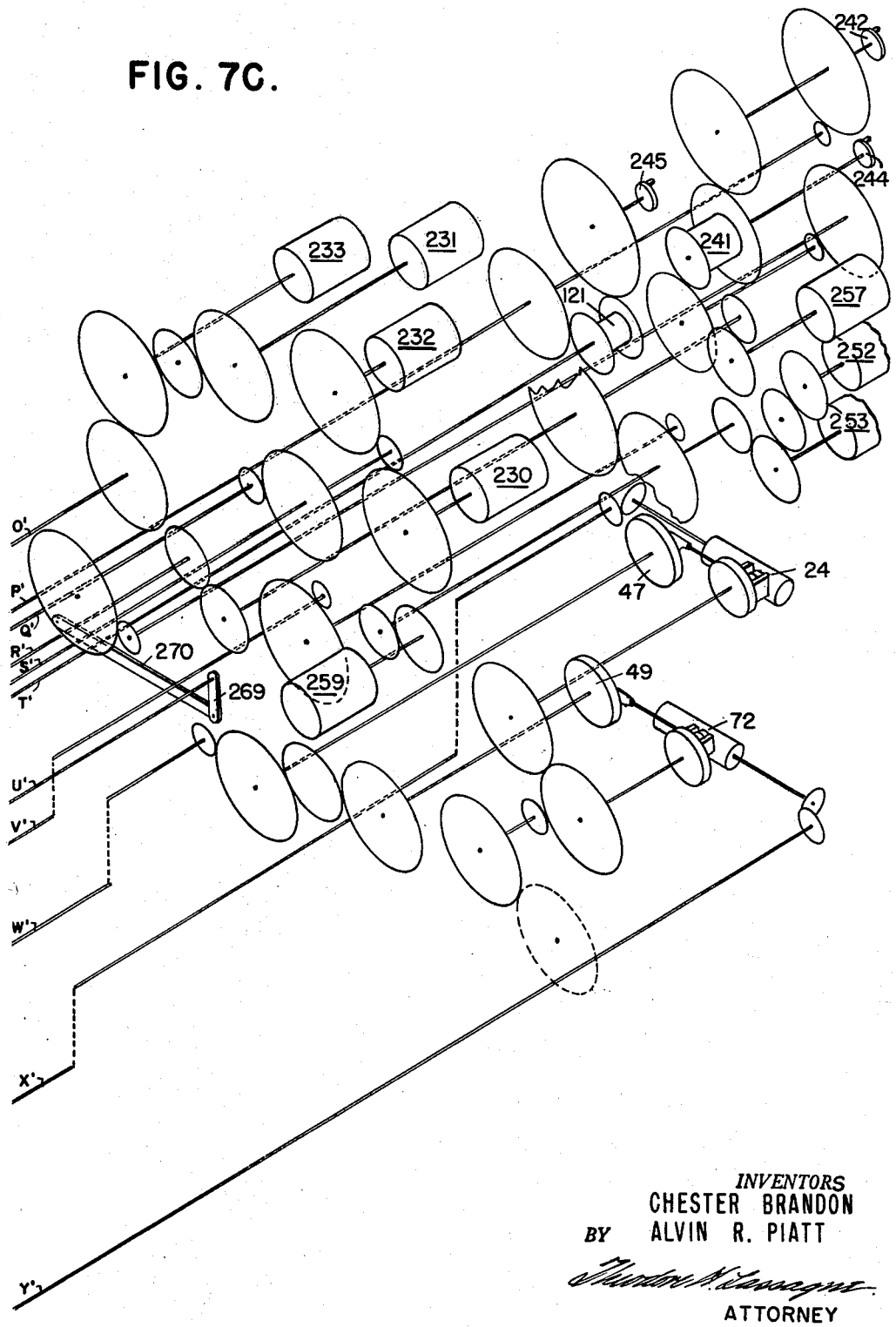

FIGURES 7A, 7B and 7C taken together, with correspondingly lettered parts alined, show the elements employed in Section II of the computer in exploded schematic form.

Figure 8A:
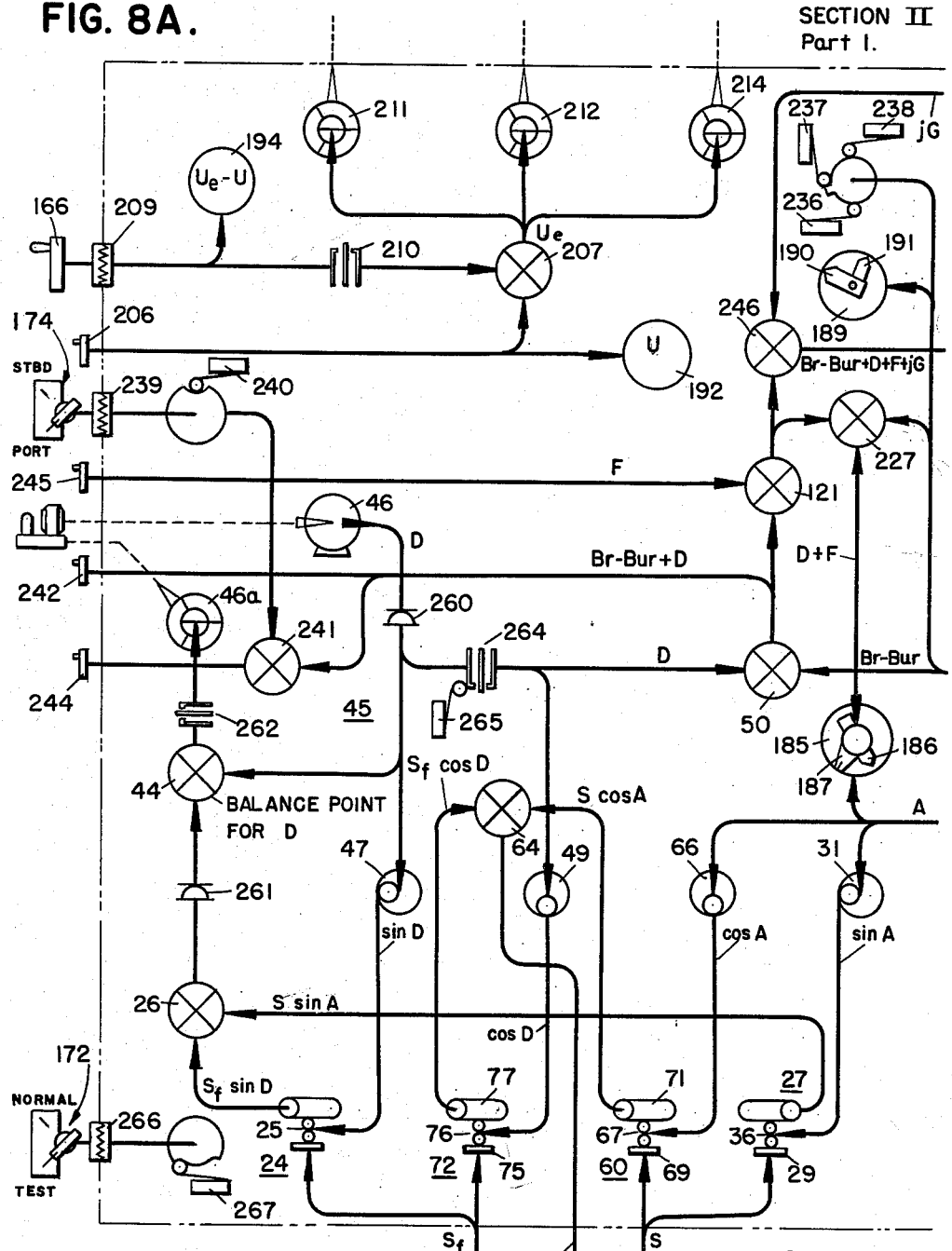
Figure 8B:
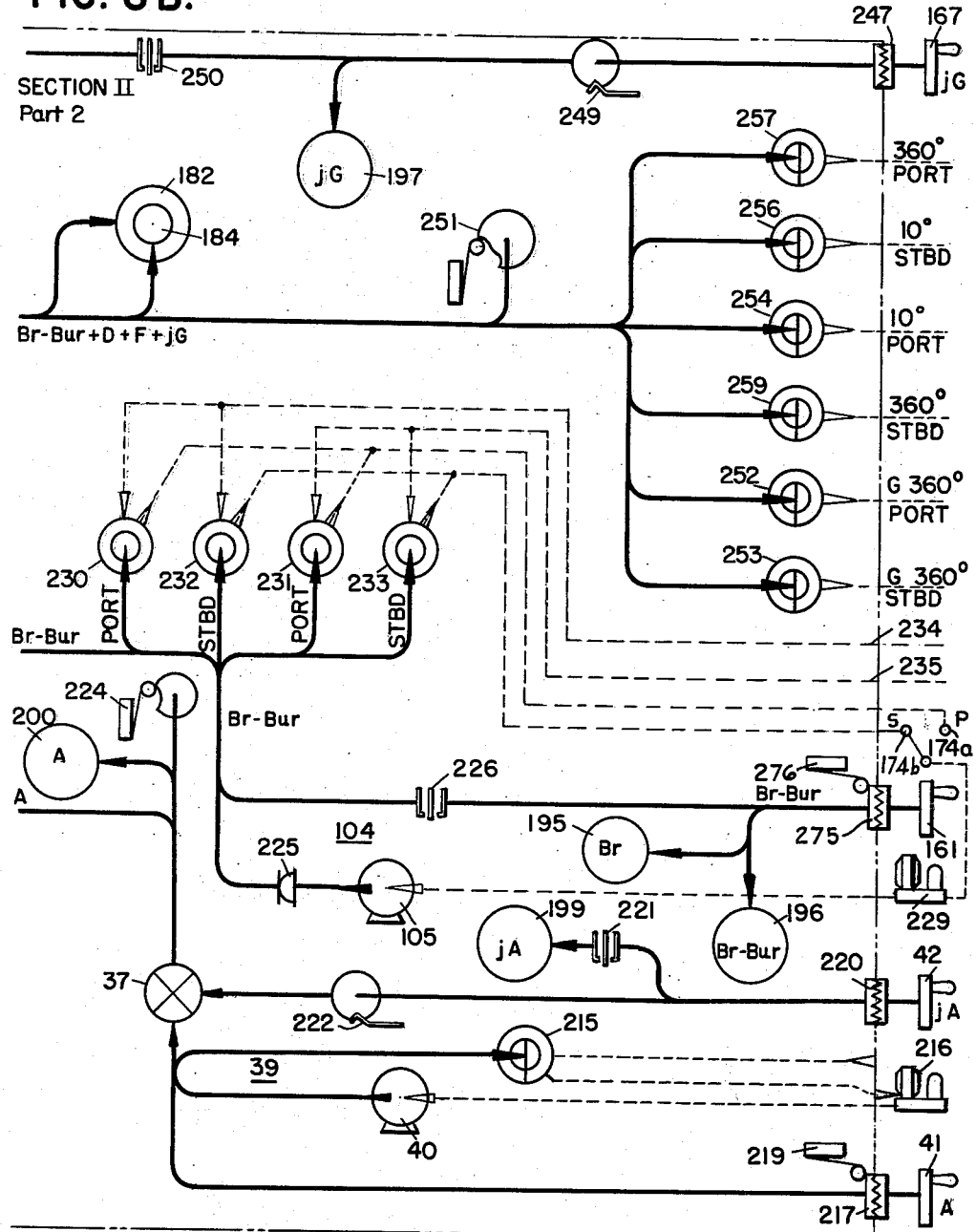

FIGURES 8A and 8B, taken together with correspondingly lettered parts alined, illustrate the Section II elements in functional schematic form.

Figure 9A:
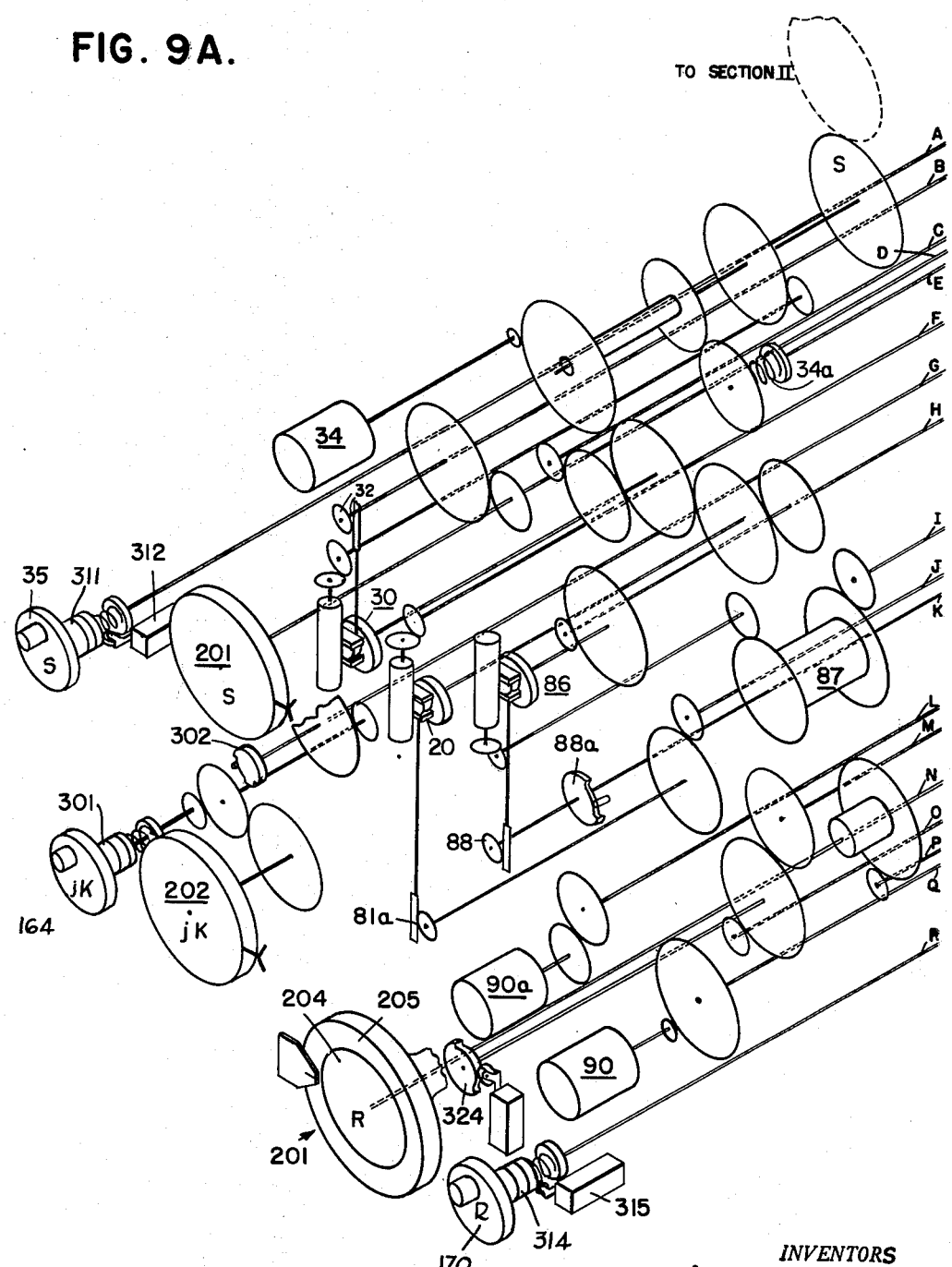
Figure 9B:
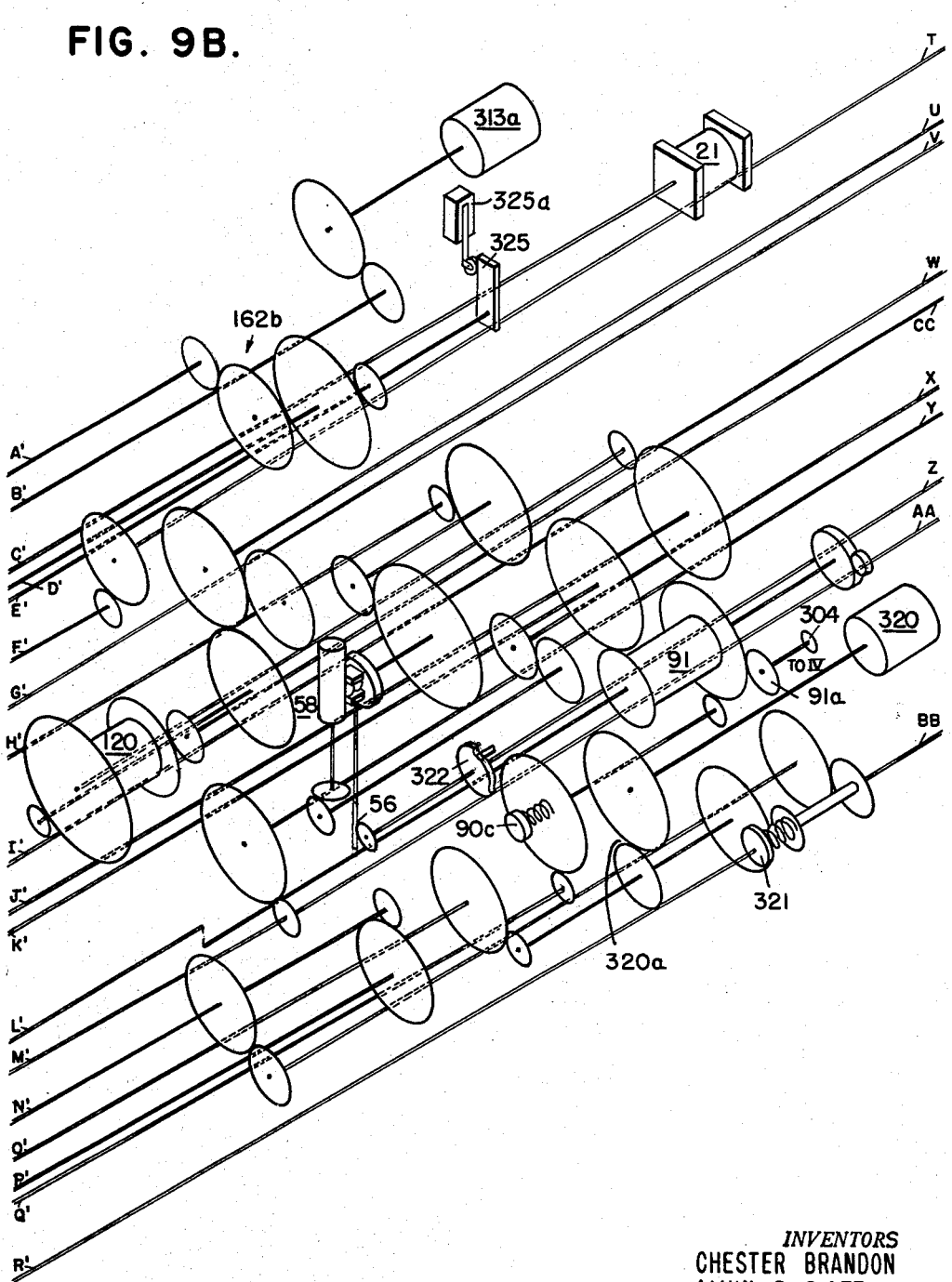

FIGURES 9A, 9B and 9C, taken together with correspondingly lettered parts alined, show the elements employed in Section III in exploded schematic form.

FIGURE 10 is a schematic functional diagram of Section III.

FIGURE 11 is an exploded schematic view of Section IV, the analog computer section of the instrument, dealing with ballistics.

Figure 12:
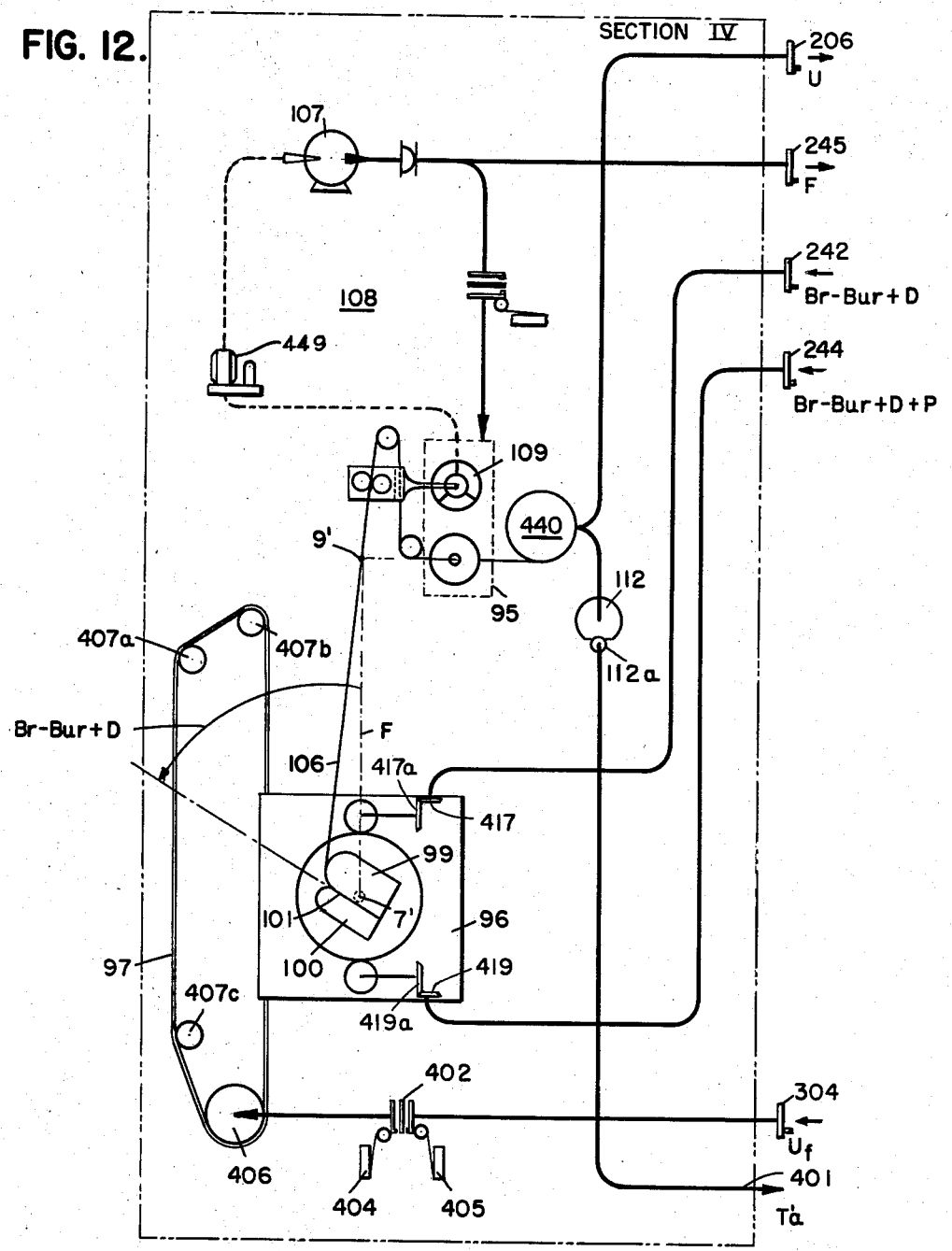

FIGURE 12 is a schematic functional diagram of Section IV.

Figure 13:
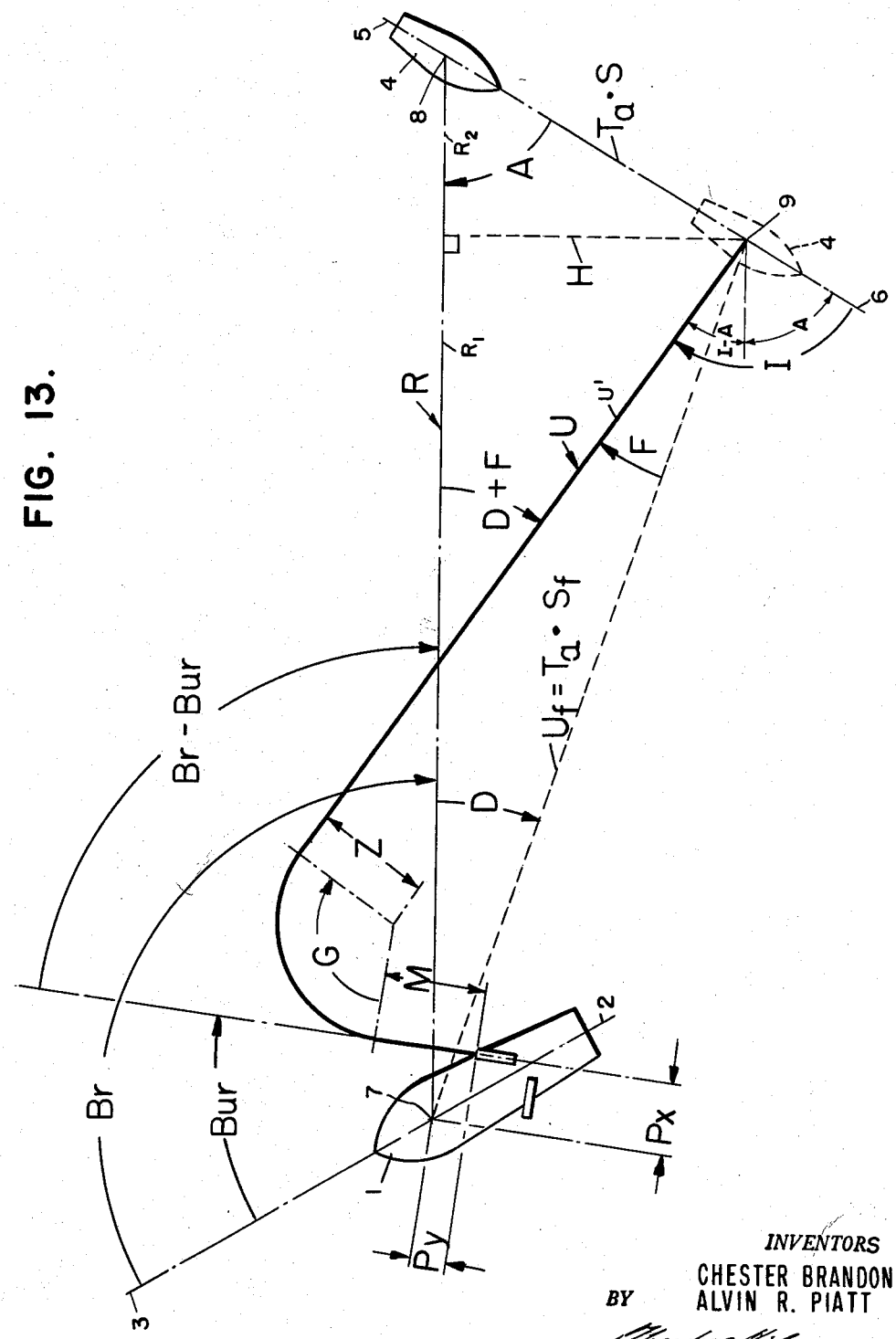

FIGURE 13 is a diagram showing the trigonometric relations between the course of own ship and the target which exist during the solution of an attack problem.

Figure 3:
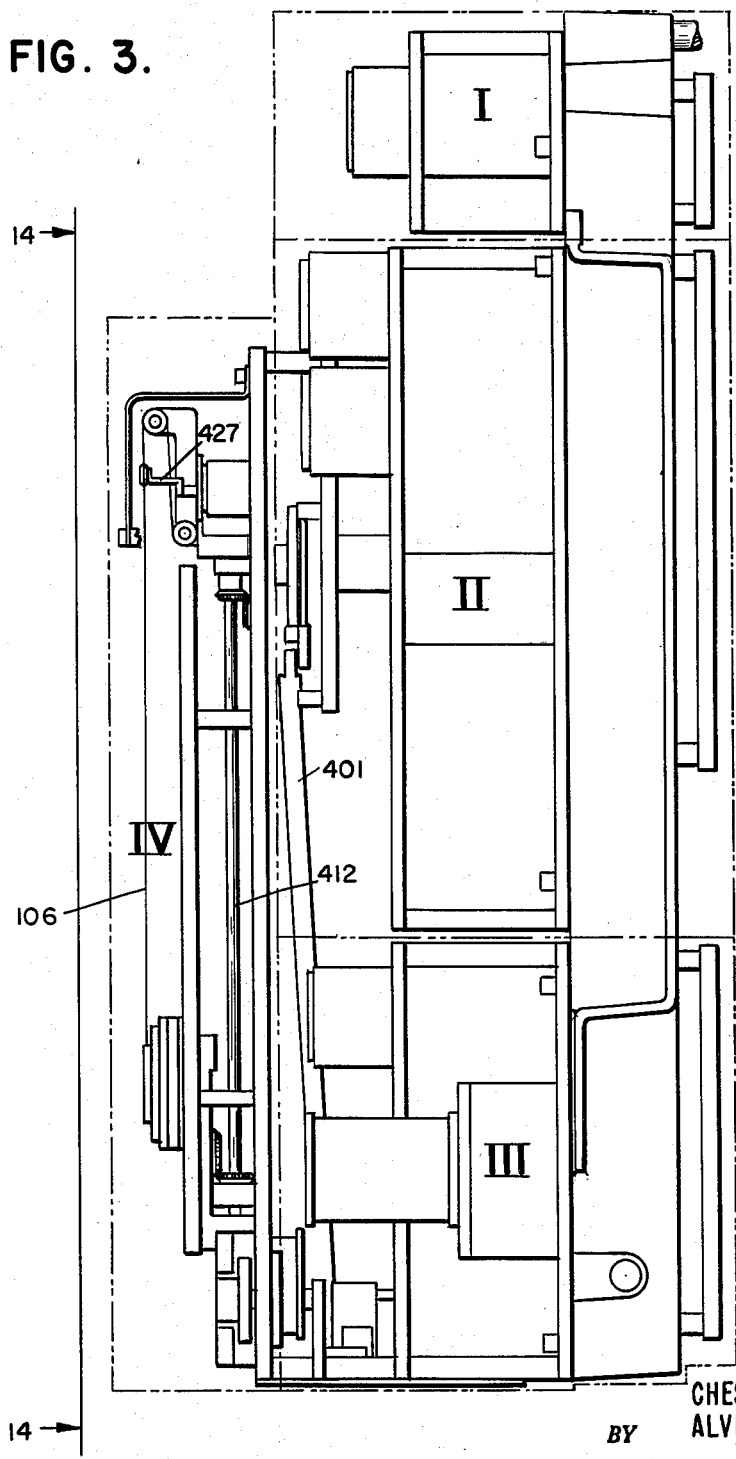
FIGURE 3 is a side view of the computer taken from the left of the showing of FIGURE 2, with the cover removed, and with the location of the computing Sections I–IV indicated by the dotted lines.
Figure 14:
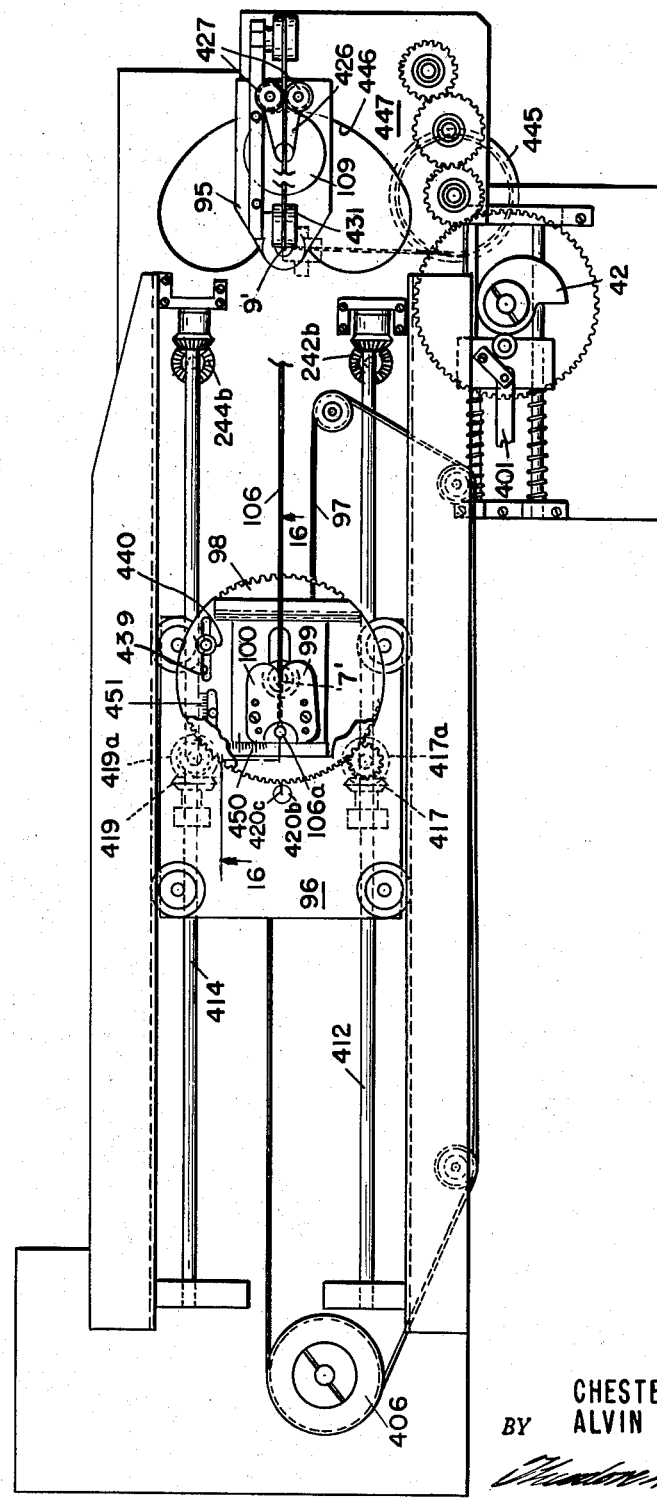

FIGURE 14 shows an elevational plan view, taken as indicated by line 14—14 on FIGURE 3, of the Section IV mechanism.

Figure 15:
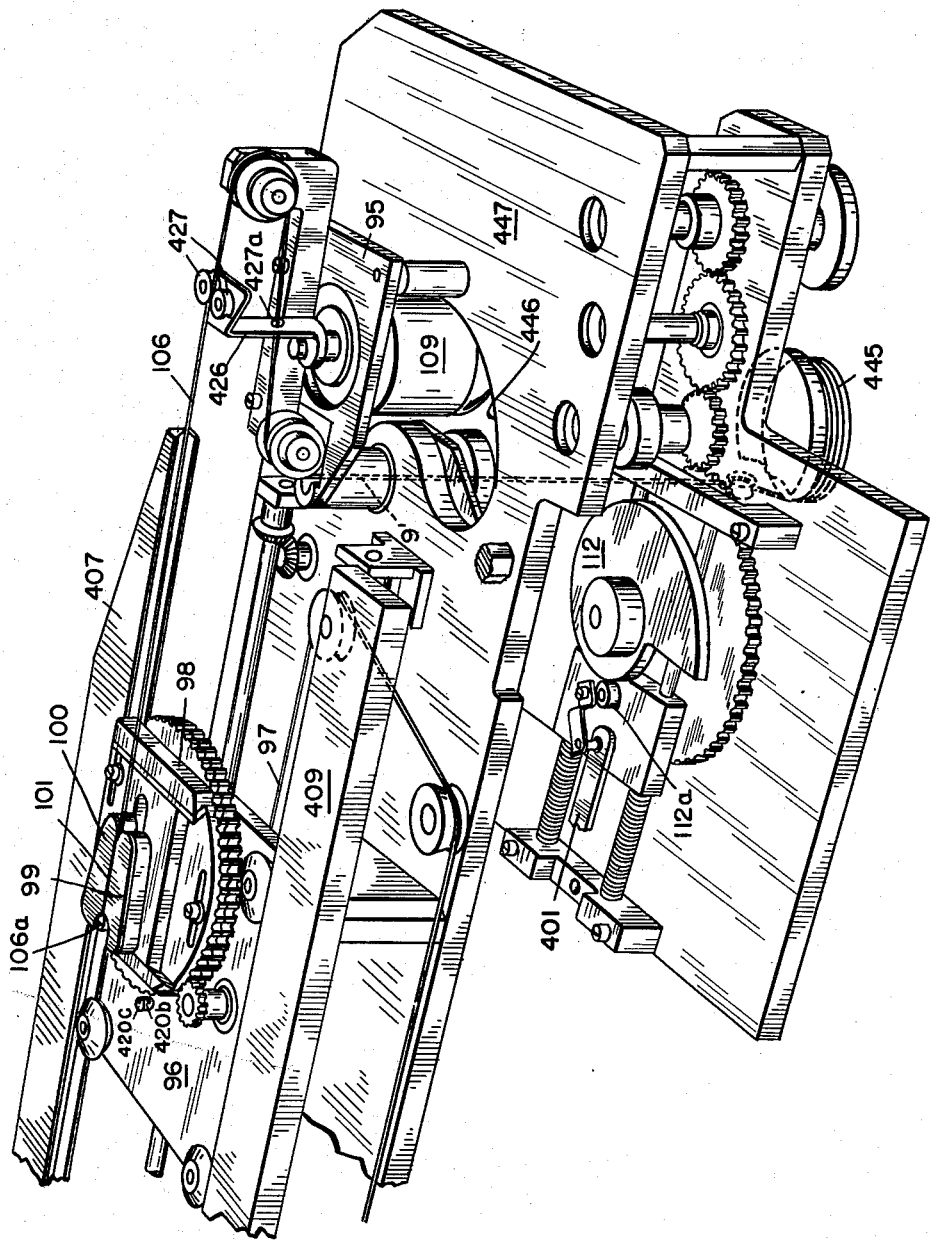

FIGURE 15 is a fragmentary schematic view showing own ship and target tables.

Figure 16:
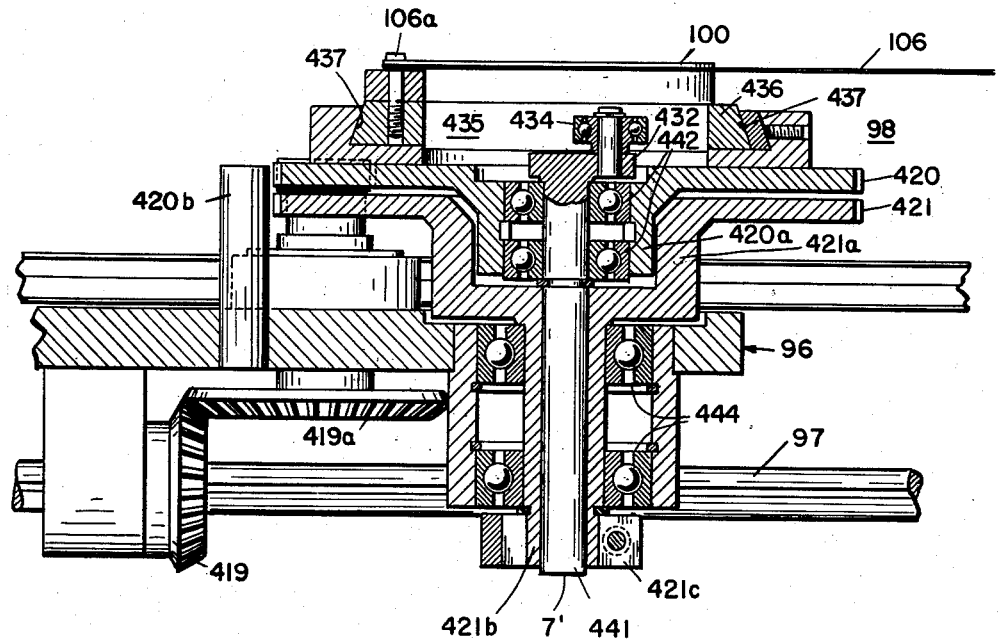

FIGURE 16 is a fragmentary sectional view taken as indicated by line 16—16 of FIGURE 15.

The theory of the solution may best be understood with reference to the trigonometric layout of FIGURE 13, which shows an attacking vessel 1 proceeding on the course indicated by a line from 2 to 3, and a target vessel 4 proceeding along a course indicated by a line from 5 to 6. When the target is observed from the sighting point 7 on own ship, the values of relative target bearing Br and range R may immediately be known from own ship's equipment. A, the "target angle" measured clockwise from the bow of the target to the range line R, which extends between the target and own ship; and S, the "target speed" along the target's course, are supplied by other equipment aboard own ship. Target angle A and speed S are assumed, for the purpose of solution, to continue as constant values from the time of firing until the moment of impact.

The solution is obtained with the aid of the trigonometric relations in a triangle drawn between own ship and the target in its present and future positions. One leg extends from the sighting point 7 on own ship to the center 8 of the target in its present position. A second leg extends from the center 8 of the target in its present position to the center 9 of the target in the position it will occupy in the future at the time of impact, or explosion point. The third leg is drawn from the center 9 of the target at the impact or explosion point to the sighting point 7 on own ship.

It is assumed that own ship is stationary during the interval needed for the solution process. The justification for this treatment is found in the fact that so short a time is required for the computation of the ballistic data and the firing of the torpedo that the movements of own ship during this period are inconsequential.

In addition, it will be seen that Br, R and A are relative values between own ship and target. Changes in these values could be the result of movement of the target only, of movement of own ship only, or a combination of such movements. They are most conveniently treated, however, in terms of the relations of the target to own ship.

The distances represented by the legs of the triangle illustrated in FIGURE 13 may now be defined in terms of velocities and times, and solved by combining known and unknown values. The length of the first leg from 7 to 8, or range R, is accurately measured by own ship's sonar equipment. The length of the second leg, from 8 to 9, is equal to the product of the time until impact by target speed, or $T_a$ times S. The target speed S and target angle A are assumed to continue constant during the torpedo run, as said above. The third leg $U_f$ is equal to the product of the time until impact $T_a$ and a hypothetical torpedo speed $S_f$. This hypothetical speed is that at which the torpedo would have to travel to proceed from point 7 to point 9 in a straight line, shown in dashes in FIGURE 13, in same length of time as it will require to arrive by following the actual compound path.

The actual path, U, shown as a heavy solid black line in the drawing, is made up of the "reach," an initial straight portion M, representing the travel of the torpedo after it is projected from the muzzle of the deck mount, through the air and in the water until the steering mechanism becomes fully effective; a substantially arcuate portion of radius Z representing the travel while turning through the gyro angle G; and a straight portion U′ representing the direct path followed thereafter to the impact point. M and Z will be constants characteristic of the particular torpedo being employed.

The relations between the values for the second and third legs of the triangle, from 8 to 9 and 9 to 7 respectively, are obtained by dropping a perpendicular H from point 9 to the range line R, thus dividing the latter into a left portion $R_1$ and a right portion $R_2$.

The perpendicular H will equal the product of the hypothetical distance $U_f$ by the sine of the angle D, or $T_a S_f \sin D$, where D represents the lead angle from the range line R to the hypothetical line $U_f$ from own ship to the impact point, and $S_f$ is the corresponding hypothetical torpedo speed. H will also equal the product of the second leg by the sine of angle A, or $T_a S \sin A$.

Equating the two values for H and cancelling out $T_a$, since the time to impact is the same for the target as for the torpedo, we have $$S_f \sin D = S \sin A \quad (1)$$

Equation 1 will be solved by means described below for the lead angle D, which will be used directly, and also converted back to the sine and cosine values for subsequent computations. The random value of $S_f$ remaining from the last previous solution is used for the first approximation, and corrected by successive computations, until an accurate solution is obtained, as described hereafter.

From the same triangle in FIGURE 13 we may set up other identities. It will be seen that R is equal to $R_1 + R_2$. Now $$R_1 = T_a S_f \cos D \quad (2)$$

and $$R_2 = T_a S \cos A \quad (3)$$

The expressions may be added together to obtain the value of R in terms of angles D and A:

$$R = T_a S_f \cos D + T_a S \cos A \quad (4)$$

Factoring out $T_a$, this expression may be rewritten as $$R = T_a (S \cos A + S_f \cos D) \quad (5)$$

Equation 5 may be solved for $T_a$, representing the run time for both the torpedo and the target until the moment of impact, utilizing the value of $S_f$ obtained during the solution of Equation 1 for D. The relation between target angle A, impact angle I, lead angle D, and the course set into the torpedo is found from $$I - A = D + F \quad (6)$$

the derivation of which will be readily apparent, with the aid of the light dotted construction lines, on inspection of FIGURE 13.

SOLUTION OF EQUATION 1 ($S_f \sin D = S \sin A$)

The solution of Equation 1 for D starts in the instrument with the use of a random value of $S_f$, usually being that remaining in Section III integrator 20 from the previous problem. This random value of $S_f$ will then be revised to give the correct solution for D by a series of approximations introduced in successive steps. Although they will be spoken of as occurring in discrete steps for convenience in exposition, it will be understood that the corrections are being carried on continuously until the final values are found.

It will be recalled that the speed S and course A of the target were known values, supplied by other equipment on own ship. The two remaining factors in Equation 1 are unknowns: D, the answer desired, and $S_f$, the hypothetical speed of the torpedo. The first step is to balance the equation to obtain a new approximation for D on the basis of the currently observed quantities S and sin A, using whatever random value of $S_f$ is then remaining in the instrument. Time motor 21 drives the disk 22 of integrator 20, so the random displacement remaining initially furnishes a rotational output to integrator 24 proportional to $S_f$.

The random value of sin D remaining in the instrument is represented by the initial displacement of the ball carriage 25 of integrator 24. The output of integrator 24 is then an uncorrected value of rotational speed representing $S_f \sin D$, the left side of Equation 1; it will be balanced in differential 26 against the right side of Equation 1, or $S \sin A$, obtained from an integrator 27. When the equation is balanced, that is, when differential 26 has a zero output, a partially corrected value of sin D will have been introduced, corresponding exactly to the random initial value of $S_f$ and the known values of S and sin A.

$S \sin A$ is supplied as a rotational speed by integrator 27, which multiplies the measured value of S, received as a drive to disk 29 from the output of an integrator 30, by sin A received from a sine mechanism 31. Integrator 30 converts data received as ball carriage displacements thru a rack and pinion 32 from a servo loop 33 including motor 34, and from a hand crank 35, into rotational form, proportional to S, but with a change of scale factor. The computed value of sin A is fed from sine mechanism 31 to integrator 27 as a ball carriage displacement. The sine mechanism 31 in turn receives the observed target angle A from a differential 37, which is primarily fed from ship's instruments by a servo loop 39 including the motor 40. Provision is also made to introduce manual corrections to target angle, and manual spot target turn corrections, through differential 37. The target angle corrections are made through handcrank 41, while spot turn predictions are entered through handcrank 42.

BALANCING FOR D

Differential 26 will have zero output if the proper value of sin D is present in integrator 24 for the value of $S_f$ remaining in the computer. If not, differential 26 will have an output to one side of a differential 44, which is a part of a servo loop 45 including servo motor 46 and a null-seeking control transformer 46a. The other input to differential 44 will initially be a value proportional to D remaining from previous computations in the servo loop 45. The difference between the two values will produce an error signal from control transformer 46a in the servo loop 45, resulting in the driving of servo motor 46 in the proper direction to correct the error. This will feed a new value of angle D into one side of differential 44 and into the sine mechanism 47 and the cosine mechanism 49. The correction of D will continue until the proper value of sin D has been inserted to make the output of differential 26 zero, and the output of differential 44 has driven control transformer 46a to null. At this point it will be seen that Equation 1 has been solved to give the correct value of D for the random value of $S_f$ remaining in the machine. This value of D is forwarded also from loop 45 to differential 50 for use in other computations.

SOLVING FOR $T_a$

The next step in arriving at the proper value of $S_f$ is to correct the value of $T_a$. This is begun by solving for $T_a$ in Equation 5, repeated here for ready reference:

$$R = T_a(S \cos A + S_f \cos D) \quad (5)$$

The value of range R is known from ship's sonar. The unknown $T_a$ is present at the beginning merely as a random value, normally that remaining from the last prior solution. S and A are quantities obtained as described supra for Equation 1. The same random value of $S_f$ remaining in the instrument is used, together with the new D value found in the preliminary solution of Equation 1. When the two sides of Equation 5 have been brought into balance, it will be seen that the proper value of $T_a$ will have been introduced to match the partially corrected D value and the random $S_f$ value.

The balancing point for solving Equation 5 is the subtractive differential 51, and the solution has been found when a steady state condition has been reached. Range R signals from ship's sonar are introduced to one side of differential 51 by means of a servo loop 52, including servo motor 54. The loop output acts through a cam 55 and a rack and pinion 56. The rack and pinion 56 converts the rotational range information to a displacement proportional to range. This displacement is used to position the ball carriage 57 of an integrator 58, the disk 59 of which is driven by time motor 21. Thus, a rate factor is introduced in yards/r.p.m. corresponding to that in integrators 30 and 60, the outputs of which represent knots per r.p.m. R, the output of cylinder 61 of integrator 58, is applied as a rotational speed to one side of the balancing subtractive differential 51.

The other side of differential 51 receives a value through integrator 62 which must represent, when Equation 5 is balanced, the product of the rotational speed proportional to the sum $(S \cos A + S_f \cos D)$ from differential 64 and the unknown $T_a$. $T_a$, inserted as a displacement of the ball carriage 65 of integrator 62, is, as discussed above, initially a random value, but will have been solved for when the differential 51 output becomes constant.

OBTAINING THE FACTORS $T_a$ AND $(S \cos A + S_f \cos D)$

It will be recalled that the target angle A was available, together with any manual corrections and spot corrections for hard turns, as the output of differential 37. A is converted by cosine mechanism 66 to $\cos A$, and applied as a displacement to the ball carriage 67 of integrator 60, the disk 69 of which is driven at a rotational speed proportional to target speed S by the cylinder 70 of integrator 30.

Thus the output from the cylinder 71 of integrator 60 is rotation at a rate proportional to $S \cos A$, which is applied to one side of the additive differential 64.

The other side of differential 64 receives $S_f \cos D$ as the output of integrator 72. The initial random value of $S_f$ is furnished from cylinder 74 of integrator 20 to the disk 75 of integrator 72, while its ball carriage 76 is positioned by the $\cos D$ output of cosine mechanism 49. The cylinder 77 output of integrator 72 thus represents the $S_f \cos D$ value with D corrected to match the initial random value of $S_f$. The value of D will be made progressively more exact as $S_f$ is approximated more and more closely by later steps.

$S \cos A$ and $S_f \cos D$ are added in differential 64 to obtain the quantity in parentheses in Equation 5. This sum is applied as the drive to the disk 79 in the integrator 62, the output of which is applied to the side of differential 51 opposite that receiving R from integrator 58. The output of differential 51 is then fed back thru a rack and pinion 51a to position the ball carriage of integrator 62. It will be apparent that, since the entire output from integrator 62 to differential 51 represents $$T_a(S \cos A + S_f \cos D)$$

when a steady state condition is reached, the displacement of the ball carriage 65 of integrator 62 must have been proportional to $T_a$.

This displacement proportional to $T_a$ is also forwarded from rack and pinion 51a to a subtractive linkage differential 80, which is the balancing point for $S_f$. It will there be matched against a value $T_a'$ obtained by means of the mechanical scale model in Section IV, and servo methods used to arrive at a corrected value for $S_f$. This corrected $S_f$ value will then be applied to the ball carriage 81 of integrator 20 to complete the computation cycle for the first approximation.

The displacement proportional to $T_a$ will also be introduced as a ball carriage 82 adjustment to integrator 84, to initiate correction of the hypothetical value $U_f$ in the scale model.

DETERMINING $U_f$ $U_f$ is the hypothetical value of a linear quantity in the mechanical analog portion of the ballastics section, representing the distance from the sighting point 7 to the explosion point 9 in FIGURE 13, and proportional to the product of $T_a$ and $S_f$. The solution for $U_f$ begins with the use of the $T_a$ output of balancing differential 51, converted to a displacement through rack and pinion 51a, to position the ball carriage 82 of an integrator 84. The disk 85 of integrator 84 is driven by the $S_f$ output, initially a random value, of integrator 20. The product of $T_a$ and $S_f$ will then be a rate of rotation, or rotational speed, representing a partially corrected value of $U_f$, and successively corrected aproximations of these factors will be required before reaching the true value. The product $U_f$ is to be furnished to the ballistics section, but since the output of integrator 84 is a rotational speed, it must be converted to a displacement for use in the scale model.

The conversion is effected with the assistance of an integrator 86, a differential 87, a rack and pinion 88, and a servo loop 89, including a servo motor 90 and a differential 91. The rotational output $U_f$ from the cylinder of integrator 84 is applied as an input to one side of differential 87. It will there be matched against an input supplied to the opposite side of differential 87 as the output of integrator 86. In integrator 86 the disk 93 is driven by the time motor 21 supplying a constant multiplying factor. The displacement from center of the ball carriage 92 of integrator 86 is determined by a rack and pinion 88 which is positioned by the output of differential 87. Thus in order for a balance to have been obtained in differential 87 between the rotational inputs from integrators 84 and 86, there must have been derived from the output of differential 87 the factor $U_f$. The scale factors are so chosen that the maximum limits of linear displacement applied to the ball carriage 92 will be within the permissible displacement range, and a limit stop 88a is interposed to prevent a greater value from being introduced. Thus, a linear displacement proportional to $U_f$ is obtained at the ball carriage, which has been derived from the rotational rate, or shaft speed representing $U_f$, which constituted the output of integrator 84. When the rates of rotation of the outputs of integrators 84 and 86 match, there will have been an angular displacement at the differential output, as well as a linear displacement at the ball carriage 92, proportional to $U_f$. There will then be no further rotational output from differential 87 until the computed value of $U_f$ undergoes a change.

A movement proportional to $U_f$, but with a different scale factor than that at the ball carriage 92, is required for the scale model in the ballistics section. Whereas the entire range of $U_f$ is represented at the ball carriage by a displacement of a fraction of an inch, the corresponding range in the scale model requires a displacement of several inches. This is provided with the aid of a servo loop which includes a servo motor 90 and a differential 91. One input to differential 91 is the value $U_f$ supplied in the form of the angle thru which the output shaft of differential 87 has turned in reaching a balanced condition. The other input to differential 91 is supplied by the servo motor 90, which will operate until it has matched its rotational angular input to differential 91 to that of the $U_f$ value being received from differential 87. Normally the maximum displacement of ball carriage 92 will be produced by rotation of the differential 87 output shaft thru half a revolution, or an angle of 180°.

The servo loop 89 also includes control transformer 90a, amplifier 90b, and a friction clutch 90c cooperating with servo motor 90 and differential 91 to provide values of $U_f$ to the ballistics section with a proper scale factor and power adequate to drive the carriage-traversing mechanism in the scale model. The output of differential 91 positions the rotor of control transformer 90a, initiating signals which will be strengthened by the amplifier 90b to drive the servo motor 90 into the differential 91 until control transformer 90a reaches a null position. The value of $U_f$ introduced to the ballistics section will be proportional to the value of $U_f$ at the ball carriage of integrator 86, since the servo motor 90 is connected thru suitable gearing to the cable drum 406 which positions the movable carriage 96 of the ballistics section in proportion to $U_f$.

THE BALLISTICS SECTION

The ballistics Section IV solves for $U_f$ and introduces factors providing for the curved path of the torpedo, the variation in speed of the torpedo along its path, and the parallax between the sighting point and the torpedo mount. Physically, $U_f$ is represented in the analog computer of Section IV by the spacing between the axes of rotation of two tables. Table 95 represents the target. It is rotatable about a fixed axis 9', corresponding to the impact point 9 in FIGURE 13. Table 96, own ship's table carriage, supports an adjustable mechanism indicated generally as 98, representing own ship's table. The mechanism 98 is rotatable about an axis 7', representing the sighting point 7 in FIGURE 13, and may be traversed along rails in a straight line to insert to scale the distance $U_f$ between these axes. The rotation of the servo motor 90 in Section III to bring the control transformer 90a to null, will be proportional to $U_f$, but will be adjusted to a different scale factor, and will provide the greater torque required to drive the cable drum 406, about which is wound the table-traversing cable 97, to properly position own ship's table 96.

Figure 4:
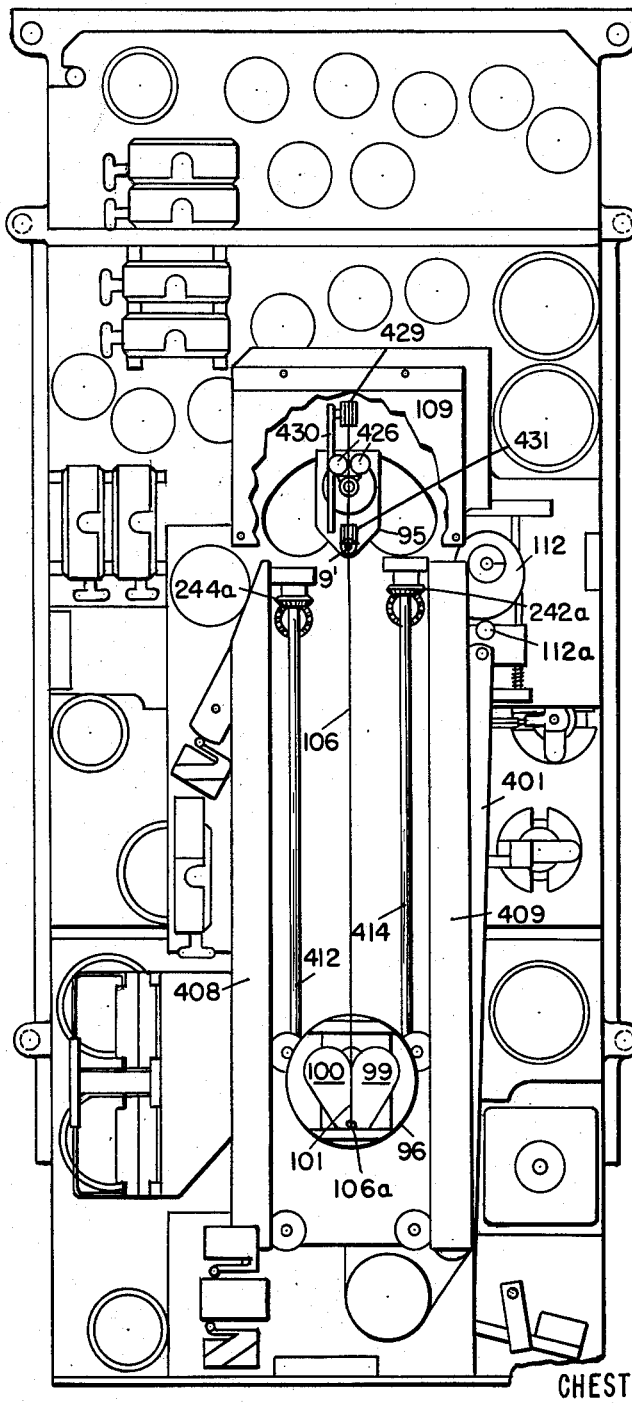
FIGURE 4 is a rear view of the interior of the computer, partially broken away to show the analog portion of Section IV.

The rotatable table 98 representing own ship has two cams 99 and 100 mounted side by side, with straight adjacent edges 101, representing the axis of one of the torpedo-projecting tubes, and looking in the direction of the torpedo path. The right hand cam 99 represents the curved path of the torpedo with a right gyro angle, and the left hand cam 100 represents the path of a torpedo with a left gyro angle. The right and left cams are designed with curvatures representing the known ballistic characteristics of the particular torpedo for which they are intended. In FIGURE 4, similar right and left turn cams are shown. FIGURE 12 illustrates the case in which the cams have different radii of curvature, those shown having been designed for use with a torpedo turning more sharply in one direction than in the other.

The curved paths of the torpedo may not be true circular arcs, since there is a tendency to slew. The actual path for each type may be incorporated in the shaped cams 99 and 100 quite readily, whereas extremely complex computing equipment is otherwise required to approximate it.

The position of the two cams 99 and 100 with respect to the axis 7' of own ship's table 98 represents the parallax between the torpedo tube and the sighting point, and is adjustable to accord with the position on own ship of that point relative to the torpedo tube mount. These cams may be adjusted also to allow for the difference in water entry point, due to the air travel of the torpedo and the speed of own ship.

The lead angle D is provided, as explained previously, by the torque and speed amplifying loop 45, including servo motor 46. It is added in differential 50 to $Br-Bur$ furnished by a servo loop 104, including servo motor 105, fed by other equipment on own ship, with provision also for manual inputs through a handcrank 161. The output gearing from differential 50 rotates on ship's table 98 through the angle $Br-Bur+D$, so that the division line 101 between the cams, representing the torpedo tube axis, will be properly alined relative to $U_f$. The output of differential 50 is also supplied to differential 121, where it is added to the angle F.

The path of the torpedo is represented by a small flexible stainless steel cable 106, which is anchored between the two cams 99 and 100 to a stud 106a, and is made to pass over the point 9', representing the center of the target at the explosion point, by servo means, as described below. When own ship's table 98 has been rotated from the line representing $U_f$ by an angle $Br-Bur+D$, it may be seen by comparison with FIGURE 13, that the cable will take a position passing around one of the cams 99 or 100 and toward the point 9', duplicating exactly the torpedo path, as long as the cable passes directly over the simulated explosion point 9', represented by the center of rotation of the target table 95.

The table 95 representing the target is rotatable about an axis 9' in the instrument simulating the explosion point at target center 9, and is arcuately reciprocable through suitable gearing by a servo motor 107 forming part of a servo loop 108. A small synchro control transformer 109 is mounted in the target table 95. As described in detail hereafter, the control transformer 109 has a fixed electrical stator field. A crank arm 426 fixed to the shaft of the control transformer 109 carries two opposed rollers 427, which ride on the cable 106 and sense its direction with respect to the table. The control transformer 109 is adjusted for zero output when the cable passes over the simulated explosion point 9'. Hence, when there is no output from the control transformer 109, the cable 106 is representing exactly the torpedo path to a point determined by the values of $U_f$ and angle $Br-Bur+D$. The rotation required to bring the control transformer 109 to null is the angle F between $U_f$ and U, a value returned to differential 121 and used later in finding the gyro angle G. The rotation of the spring loaded cable take-up drum 445 on which the cable 106 is wound when properly zeroed, represents the length of the torpedo path to the point determined by $U_f$ and $Br-Bur+D$. Since the torpedo speed is generally not constant during its run, a cam 112 driven by rotation of the spring-loaded cable take-up drum 445 is provided to introduce a corrected value. The cam 112 is shaped so that the displacement of a cooperating cam follower 112a will represent the run time $T_a'$ for the run $U_f$ for standard conditions.

The value of $T_a'$ represented by the displacement of the cam follower 112a will be correct for the value of $U_f$ and D, which have been determined at standard conditions. Variations in the depth at which the torpedo run is to be made, the sea water temperature and various other factors may affect the speed, and hence the run time substantially. The correction may be expressed by dividing $T_a'$ by one plus a percentage factor representing the speed reduction anticipated, which is the same as multiplying $T_a'$ by the reciprocal value, $$\frac{1}{1+jk}$$

where $jk$ is the percentage speed reduction factor.

These corrections are inserted manually through handcrank 164 and a speed-correction multiplying mechanism 113 to provide the proper quantity for matching in subtractive linkage differential 80.

CORRECTING $S_f$

It will be remembered that the determination of $U_f$ and D was based upon the use of a hypothetical value for $S_f$, which initially was the random value of $S_f$ remaining in the instrument when the problem was started. From this random $S_f$, the run time $T_a$ was determined. The computed value of $T_a$ will equal the corresponding value $T_a'$, as measured in the ballistics section only when the hypothetical value of $S_f$ is correct. The solution point for $S_f$ is the differential linkage 80. One input to linkage 80 is a displacement proportional to $T_a'$, as measured in the scale model. The other input to linkage 80 is a displacement proportional to computed $T_a$ from differential 51. The output of differential linkage 80 operates in a scale-changing and biasing servo loop 114, positioning the ball carriage 115 of a servo integrator 116. The disk 117 of integrator 116 is driven by the reference motor 21. When the inputs to the differential linkage 80 are equal, the ball carriage 115 of integrator 116 will be off center by a distance of the order of one sixteenth of an inch. The reason for this displacement is that it is necessary to prevent the ball carriage from being zeroed to the center of the disk in a balanced condition. If this were to occur, the time motor 21 would continue to rotate the integrator disk 117, and with the ball carriage 115 exactly centered, the result would be excessive wear. To avoid this possibility, a biased integrator combination is used.

The operation of the biased differential loop 114 is to be understood from FIGURE 10 as follows: the output of the cylinder 119 of integrator 116 is applied to one side of a gear differential 120, the other side of which receives the same input from time motor 21 that the disk 117 does. Hence, the integrator 116 and the differential 120 acting together constitute the integrator, so that the output of differential 120 is the biased equivalent of the output of cylinder 119. For zero output of differential 120, the ball carriage 115 may be a quarter of an inch off center because the gear differential 120 is driven at one third the speed of the disk 117 of integrator 116, and the displacement range of the ball carriage is about three quarters of an inch. The output of the integrator is used to re-position the ball carriage 81 in a direction tending to make the value of $S_f$ one which will equalize the $T_a'$ and $T_a$ values. A change in $S_f$ will cause changes in D, $T_a$, $U_f$, U and $T_a'$. By a continuous solution for D, $T_a$, $U_f$ and $T_a'$, and a continuous correction of $S_f$, these functions will assume their actual values within the solution time of the instrument.

GYRO ANGLE G

When D and $U_f$ have assumed their correct values, the location of the inpact point is determined. There remains the final step of solving for the torpedo gyro angle G.

This angle is that through which the torpedo must swing after it leaves the deck mount in order to be headed toward the impact point 9. Inspection of FIGURE 13 will show that it may be expressed as $$G = Br - Bur + D + F \tag{6}$$

The quantity $Br - Bur + D$ from differential 50 is added in differential 121 to the value of F from the servo loop 108 including motor 107. This angle will be set into the torpedo electrically before it is fired.

THE PHYSICAL EMBODIMENT

Figure 1:
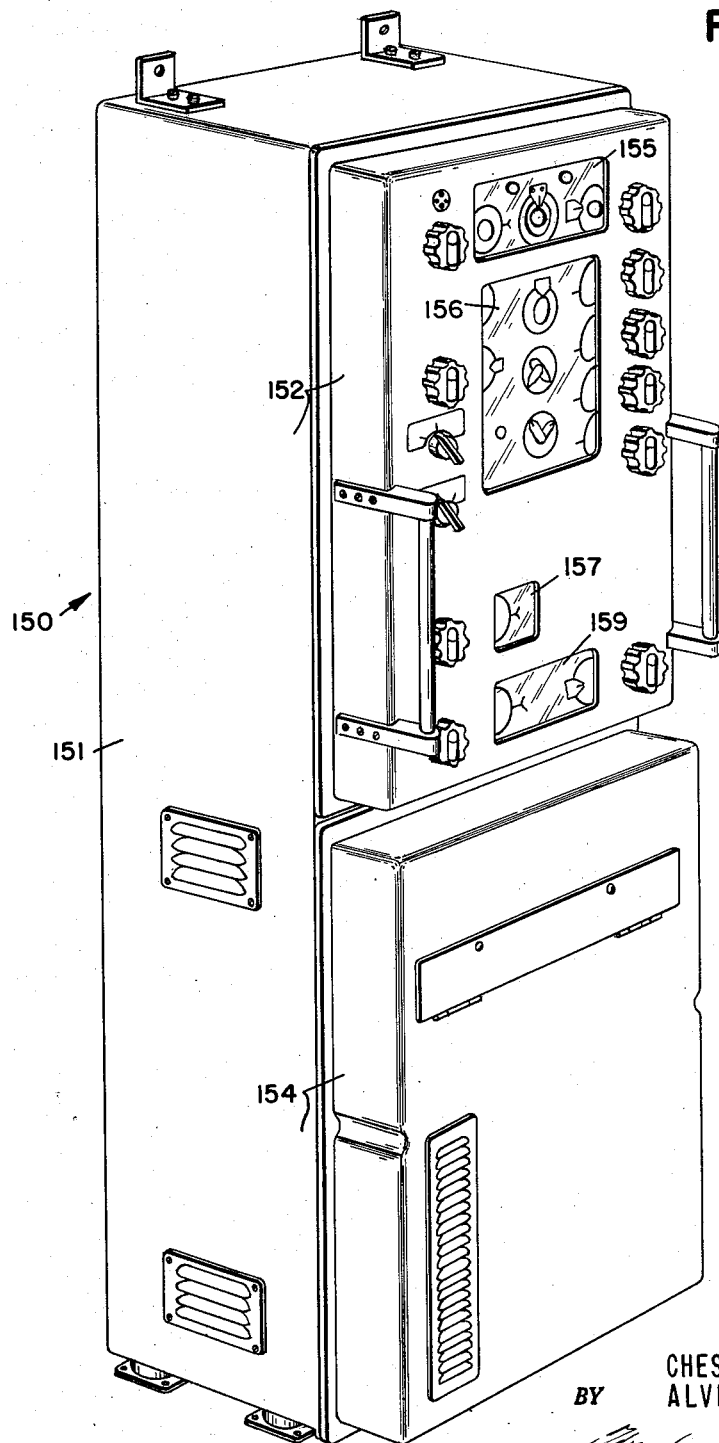
FIGURE 1 shows the entire instrument in perspective, including the computer and the amplifier.

The invention, as explained above with the aid of the functional schematic diagrams of FIGURES 8a, 8b, 10 and 12, is illustrated in perspective in FIGURE 1 of the drawing. The instrument, generally designated as 150, comprises two sections mounted in a case 151. The upper part of case 151 contains the computing unit 152, while the lower portion 154 houses the power supply and amplifier units. The face of the computer unit 152 is shown to an enlarged scale in FIGURE 2 of the drawing. The unit has a number of knobs, described in detail hereafter, for the manual insertion of various values, and includes certain switches for special conditions, together with all of the dials on which the solution information may be read.

The knobs are of a special type designed to permit the rapid insertion of data without danger to an operator. The details of the design of these knobs have been covered in the pending application of Willard J. Opocensky, Serial Number 317,307, filed October 28, 1952, entitled "Selectively Engageable Control Knob," which has a common assignee with the present application.

The dials are grouped functionally behind four sealed transparent panel faces disposed in substantially vertical alinement centrally of computing unit 152. The upper center dial group 155 is arranged to display information as to the torpedo settings to be inserted for a manually controlled torpedo run, and for manual or automatic depth control.

Beneath the upper center dial group 155, a middle center dial group 156 is located to display on three main, and a number of subsidiary dials, information concerning the trigonometry of the attack problem. At a position below the dial group 156, a dial face 157 affords a view of a dial indicating target speed in knots. Beneath dial face 157 is located a torpedo data dial face 159 showing values of jK and range as previously defined.

Returning to the top of the computing unit 152: a group of knobs is disposed in substantially vertical alinement on the left. To the left of dial group 155 is a knob 160 for the entry of values of manual $U_e$ at 400 yards per turn. Beneath knob 160, a target bearing knob 161 is provided for the insertion of Br values at ten degrees per turn. The computer is so calibrated that the constant values of Bur is subtracted from Br. Next beneath knob 161 is a control switch knob 172, arranged to shift the circuitry to either test position or to normal position. Beneath knob 172, a second switch knob 174 is arranged for the entry of parallax for either port or starboard attacks. Near the lower left hand corner of the cabinet is disposed a handcrank 35 for the entry thru a coupling 162 and switch 162a of $S_t$ at ten knots per turn, and beneath that, a handcrank 164 for the entry of the torpedo speed correction factor jk at 10 percent per turn.

On the right of the center array of dial faces is disposed another vertically alined group of control knobs, with five handcranks 165–167 and 41, 42 in the upper portion, and a sixth crank 170 near the bottom of the unit. All of these, like the knobs 160, 161, 35 and 164, are of the type described in the Opocensky application mentioned supra. The top knob 165 permits the insertion of the value $Hqz - Hq$ at the rate of fifty feet per turn. The second knob from the top, 166, inserts the factor $U_e - U$, the enabling run offset, at two hundred yards per turn. The third knob down, 167, may be used to insert the factor jG at ten degrees per turn. The fourth knob in the sequence, 41, is arranged for the insertion of a spot correction to target angle jA, at the rate of ten degrees per turn. The bottom knob 42 of the group permits inserting the angle A manually at ten degrees per turn. The lowermost knob 170 is arranged for the manual insertion of range R at four hundred yards per turn.

Through the face of the upper center dial group 155 may be read on the left ring dial 175 the Manual Enabling Run Order. This value is read on left ring dial 175 against a fixed index 175a. The dial is calibrated for the particular types of torpedoes to be used, the one shown being from 0 to 12,000 yards. In the center of the dial group 155 are disposed two ring dials, indicating the running depth order H$qz$ feet. The outer, or low speed dial 176, is calibrated from 0 to 1000 feet, while the inner, or high speed dial 177, is calibrated from 0 to 100 feet. Both values are read against a fixed index 178. At the right end of the dial group 155 are disposed ring dials 179$a$ and 179$b$, on which may be read against the fixed index 179$c$ the depth offset H$qz$—H$q$ in feet of the torpedo, either up or down from the pre-set course. In the upper portion of this dial group 155 are disposed signal lights 180 and 181, indicating respectively that the computed value of enabling run is being transmitted and that H$q$ is being received from other equipment.

In the target dial group 156 the gyro angle is displayed by the concentric ring dials 182 and 184. The outer, or low speed dial 182 is calibrated from 0 to 360°, and is read against a fixed index 183. The inner or high speed dial 184 is calibrated from 0 to 10°, and is also read against index 183.

Beneath dials 182 and 184 is disposed a dial group comprising a dial 185, engraved at 186 to simulate the target, and a pointer bearing a simulated torpedo 187 mounted concentrically therewith. Dial 185 is calibrated through 360° clockwise from the heading of target 186 as a zero point. The pointer 186 is continuously adjusted to show the target heading, and the torpedo pointer 187 is driven to show the direction in which the torpedo will proceed after turning through the gyro angle G. The difference between the angular headings of the torpedo pointer 187 and the target pointer 186 is the impact angle I. The impact angle I is read on the dial 185 against the torpedo pointer 187. The value of the target angle A may be read on dial 185 against a fixed index 188.

At the lower end of the dial group 156 is a parallax dial 189 which is under the control of the port and starboard switch 174. The position of the starboard pointer 190, or the port pointer 191, against the 0 to 360° scale indicates the value of the parallax angle which has been inserted for the particular direction of fire contemplated. The port and starboard pointers are given different colored markings corresponding to their directions, so that the operators will not be confused because of the fact that the angle B$ur$ is measured in degrees in a clockwise direction from the line 2—3 at the bow of the ship. Thus generally the angle to carry out a port attack will represent more than 180 degrees, while that to carry out a starboard attack will be less than 180 degrees. After the initial adjustment, pointers 190 and 191 are locked together and rotate as a unit.

Adjacent the gyro angle dials 182 is disposed on the left a ring dial 192 indicating the length of the torpedo run in yards against a fixed index 192$a$. On the right of gyro angle dial 182 is located a ring dial 194, on which the enabling run offset $U_e$—$U$ in yards short or over may be read against a fixed index 194$a$.

On the left of dial 185 is a dial group consisting of an outer ring dial 195 and an inner ring dial 196 therewithin, on which the value of the relative target bearing angle B$r$ may be read against fixed index 195$a$. The outer dial 194 is marked from 0 to 10° in green, in order to display the bearing figure related to that indicated by the pointer 190 on which starboard changes are also lettered in green. The inner dial 195 also displays relative target bearing from 0 to 10°, and is marked in red to correspond to the own ship port pointer 191 associated with dial 189. After the proper initial setting of dial 195 relative to dial 196, the two are locked together. On the right of dial 185 is located a ring dial 197 on which the value of the gyro angle offset G may be read against a fixed index 197$a$.

Beneath gyro angle offset dial 197 is placed a ring dial 199. The target angle spot correction $jA$ introduced through handcrank 168 registers on this dial against the fixed index 199$a$.

The lower right corner of the dial group 156 is occupied by a ring dial 200. Target angle A as received from ship's instruments, or entered manually through knob 169, is read on this dial against the fixed index 200$a$.

In the lower center of the computer unit, a dial face 157 reveals a single dial 201 on which the target speed S may be read in knots against a fixed index 201$a$.

At the bottom center of the computer housing, a dial group 159 displays the values of torpedo speed corrections in percent on the left hand dial 202 against a fixed index 202$a$, and the range in yards on two concentric ring dials 204 and 205 on the right hand side against a fixed index 204$a$. The inner high speed ring dial 204 is graduated in yards from 0 to 1000, while the outer, or low speed dial 205 is graduated from 0 to 10 in thousands of yards.

SECTION I

Section I, located physically in the upper front portion of the computer, is shown in exploded schematic perspective form in FIGURE 5, looking upward and to the right from the lower left corner. The functional schematic for this section is shown in FIGURE 6. It is the purpose of this section to supply the signals necessary to set the manual enabling run order, the running depth order, and the depth offset into the torpedo mechanism, and to display the appropriate values on the dial group 155. Electrical signals representing H$q$ at 3000 feet per turn supplied by other equipment on own ship are furnished thru transformer 125 to control transformer 126. Corresponding H$q$ signals at 300 feet per turn are furnished thru transformer 127 to control transformer 128. Control transformers 126 and 128, together with an amplifier 129 and a servo motor 130, form a servo loop 131. The strengthened output of loop 131 is applied through a friction clutch 132 and limit stop 133 to one side of differential 134.

Manual values of H$qz$—H$q$ may be entered in the opposite side of differential 134 through a handcrank 165 and a coupling mechanism 165$a$ which controls a switch 165$b$. The values so entered are displayed on the depth offset dials in dial group 155, which include an inner annular high speed dial 179$a$, and outer annular low speed dial 179$b$. The inner dial 179$a$ is calibrated in feet, while the outer low speed dial 179$b$ bears curved arrow symbols, which indicate the proper position of the high speed dial 179$a$, both being read against the fixed index 179$c$.

The corrected value of H$qz$—H$q$, represented by the output of differential 134, is passed through a limit stop 135 to the concentric H$qz$ dials, including an outer annular dial 176 and an inner dial 177. The corrected H$qz$ output of differential 134 is also forwarded to the control transformers 143, 136, 137 and 138. Control transformers 143 and 136 transmit H$qz$ signals for port attacks at 3000 feet per turn and 300 feet per turn, respecitvely. Control transformers 137 and 138 transmit H$qz$ signals for starboard attacks at 3000 feet per turn and 300 feet per turn, respectively, to the torpedo setting mechanism.

The value of $U_e$ is supplied through handcrank 160, and as far as permitted by a limit stop 140 through a disconnect mechanism 160$a$, controlling a switch 160$b$, to the synchro generator 139; and to the manual enabling run order dial 175 for display, and to the port and starboard control transformers 141 and 142, respectively, which transmit the enabling run order signals at 36,000 yards per turn to other equipment in own ship.

In the exploded view of FIGURE 5 may be seen the gearing components selected to communicate between the various elements. The number and location of gears utilized between any two points is purely a matter of engineering design, consistent with the physical restrictions imposed by the size of the instrument. Since such choices involve no inventive concepts, they will not be described in detail, although the connecting paths may be followed by noting the points of engagement between the various gears and pinions. Inasmuch as all of the output connections from Section I are electrical in character, it will be seen that there are no gearing or linkage connections to the other sections of the computer.

SECTION II

Section II of the instrument, located in the front center part of the computer case, is illustrated schematically in FIGURES 8a and 8b, and is shown in exploded schematic form in FIGURES 7a, 7b and 7c, which may be read together by alining the correspondingly lettered portions. For example, the uppermost shaft in FIGURE 7a, lettered "A," is continued in FIGURE 7b, as designated by the letter A'. The bottom shaft in FIGURE 7a, lettered "N," is continued in FIGURE 7b, by the shaft lettered N'.

Section II receives as an input through a coupling 206 the measured value of U from the analog computer of Section IV; this value is transmitted through shaft B'—B for display on torpedo run dial 192 at 6000 yards per turn, and is combined in the differential 207 with manually inserted values of enabling run offset $U_e-U$ from handcrank 166 through coupling 209. The manually inserted value is displayed on enabling run offset dial 194, within the range permitted by a limit stop 210 which prevents registering values in excess of ±one thousand yards. Indexing means 213 permit proper registry when engaging the coupling between Sections II and IV.

The $U_e$ output of differential 207 is applied at 36,000 yards per turn to synchro-generator 211, which transmits it to other equipment, and through shaft A—A' to control transformers 212 and 214, which transmit it to the torpedo setting equipment for port and starboard attacks respectively.

Section II receives electrically values of target angle A from other equipment on own ship as inputs to control transformer 215 at 360° per turn. The signals representing target angle A are strengthened by a servo loop 39, of which control transformer 215 forms a part, and which includes amplifier 216 and servo motor 40. The strengthened output of servo loop 39 and manual correction introduced by target angle handcrank 41, through clutch 217, controlling switch 219, and shafts M—M' and N'—N are inserted in one side of differential 37. The spot target corrections inserted by handcrank 42 through a coupling 220 and displayed on dial 199 within the range defined by a limit stop 221 are applied, through a detent 222, as a second input to differential 37. The output of differential 37 will then be the angle A, including spot corrections and predictions for turns; it is carried by a path including broken shaft L—L' to FIG. 7b, where it actuates switch 224, and is returned thru broken shaft K'—K to FIG. 7a, for display on dial 200. At the same time, A is transmitted to dial 185, where it is used in the pictorial representation of the problem, appearing as the heading of the target pointer 186. The value of angle A is simultaneously inserted by differential 37 thru broken shaft L—L' in the sine mechanism 31 and the cosine mechanism 66, where it is converted to the respective sine and cosine values which are applied as ball carriage displacements to the integrators 27 and 60, respectively.

Electrical lines 234 and 235 bring signals from other equipment on own ship to the computer, representing the value of Br. Line 234 brings signals representing Br at 360° per turn to the control transformers 230 and 232 for port and starboard respectively. Line 235 brings signals representing Br at 10° per turn to control transformers 231 and 233 for port and starboard respectively. All of the rotors of control transformers 230 to 233, inclusive, are positioned by the output of the servo loop 104. Servo motor 105 drives the rotors thru the broken shafts D—D' and friction clutch 225, thence thru O—O' and Q—Q'. The electrical outputs of the control transformers 230 and 231 are forwarded to a port terminal 174a, while the outputs of control transformers 232 and 233 are taken to a starboard terminal 174b. Parallax switch 174 controls a relay-actuating switch 240 which is effective to select the proper signal to be returned to servo motor 105 thru amplifier 229. Switch 240 operates thru electrical circuitry, not here shown, in associated equipment, to control all of the elements involved in a change of parallax, including the synchro generators 252 and 253, the control transformers 254, 256, 257 and 259.

Manual inputs of Br are inserted by Br handcrank 161 through coupling 275, and are combined with the output of servo loop 104 within the range permitted by limit stop 226, here ±220°. The manually inserted value is displayed on bearing dial 195. The Br value is also supplied to a service dial 196 within the instrument. Dial 196 is used only for calibrating, introducing $-B_{ur}$ values, so that the manually inserted value of Br will be represented in the servo loop by an actual insertion of $Br-B_{ur}$.

The $Br-B_{ur}$ output of loop 104 is forwarded also to differential 50, to differential 227, to dial 189, and to the ganged switches 236, 237 and 238. The path by which $Br-B_{ur}$ is transmitted to the ganged switches 237 to 238 begins at servo motor 105, thence through the broken shaft D—D', friction clutch 225, broken shaft Q—Q', back through the broken shafts S'—S and G'—G, terminating at the ganged switches 236, 237 and 238. The values of jG inserted through coupling 247 by handcrank 167 are transmitted through broken shaft J—J' to a detent 249, and are displayed on dial 197 within the range of ±20° permitted by limit stop 250. These values are also entered, by gearing leading to a detent 249, in one side of differential 246.

The parallax switch 174 shifts the parallax values wherever needed for port or starboard attacks, acting through the coupling 239 to control the relay-actuating switch 240, and passing through broken shaft I—I' and U—U' to linkages 269 and 270, which produce a rotation of associated gearing leading to differential 241.

Rotation proportional to the value of angle F received through coupling 245 from Section IV, is inserted in differential 121.

"Test" or "Normal" switch knob 172 acts through a coupling 266 to control the position of a cam switch 267, which effects the necessary circuit changes to permit testing the instrument, or returning it to normal operating condition.

Values of S are received from Section III thru suitable gearing by integrators 27 and 60. Similarly, values of $S_f$ are received by integrators 24 and 72.

Within Section II, and on the basis of corrected values of A produced as the output of differential 37 and passed thru shaft L—L', to sine mechanism 31 to supply corrected sin A to integrator 27, a corrected value of S sin A is forwarded from the latter to differential 26. The same values of A from differential 37 are also applied to cosine mechanism 66 to produce a corrected output of S cos A from integrator 60, which is applied to the differential 64. The other input to differential 64 is the $S_f$ cos D output from integrator 72, received through broken shaft Y'—Y. The corrected output of S cos $A+S_f$ cos D from differential 64 is then forwarded to Section III.

The servo loop 45, including null-seeking control transformer 46a, introduces corrected electrical values of sine D to the servo motor 46. The resulting shaft rotation of servo motor 46 drives thru friction clutch 260, as far as permitted by limit stop 264 and control switch 265, to introduce the corrected and strengthened D values to differentials 44 and 50. In addition, progressively corrected values of D are supplied through broken shaft W—W' to the sine mechanism 47 and the cosine mechanism 49, as mentioned above. The new output of sine mechanism 47 repositions the ball carriage of integrator 24, returning its output through broken shaft X'—X to the differential 26. The corrected cosine output from cosine mechanism 49 re-positions the ball carriage of integrator 72, supplying corrected $S_f$ cosine $D$ through the broken shaft Y'—Y to differential 64. It will be recalled that the output of differential 64 was forwarded to Section III through appropriate gearing supplying $S \cos A + S_f \cos D$.

Differential 26, which balances $S \sin A$ from integrator 27 against $S_f \sin D$ from integrator 24 through broken shaft X'—X, forwards its output through a friction clutch 261 to one side of the differential 44. The other input side of differential 44 received D from the servo loop 45. A null condition in the output of differential 44, which operates within the range defined by a limit stop 262 will not be obtained until a proper preliminary balance for D is reached. This value is inserted at the same time in differential 50, where it is used to produce the sum $Br - Bur + D$. This sum is forwarded to Section IV through broken shaft P—P' and coupling 242. The sum is also added to parallax P in differential 241 and returned to Section IV thru coupling 244. The same value of $Br - Bur + D$ is also forwarded through the broken shaft T—T' to the differential 121 where it is combined with the value of F. The output of differential 121, that is, $Br - Bur + D + F$, is forwarded to differentials 227 and 246. Its path to differential 227 is through the broken shaft T'—T. The inputs of differentials 227 and 246 are directly geared together. In differential 277, $Br - Bur$ is subtracted from the sum $Br - Bur + D + F$, so that the value of $D + F$ may be supplied as an output from differential 227 to dial 185, the path being through broken shaft H'—H. The $Br - Bur + D + F$ output of differential 121 is corrected in differential 246 by $jG$ manually inserted through handcrank 167 and coupling 247, and broken shaft J—J', and the combined output is forwarded to the synchro generators 252 and 253 and control transformers 254, 256, 257 and 259, where are produced the electrical signals which are transmitted to other equipment on own ship. The output path from differential 246 is a series of gears, 246a, 246b, 246c, 246d, and 246e, through broken shaft E'—E, to concentric dials 182 and 184 for display, and returning on broken shafts F—F', and R—R' to control transformers 256, 257 and 259. A shaft and gear 246d' fixed to gear 246d provides a connection to the control transformer 254. The control transformer 256 is driven by the gear 246b. Synchro generators 252 and 253 are driven through the same shaft as control transformer 259.

The computations carried out in Section III of the computer will next be considered.

SECTION IIII

Figure 2:
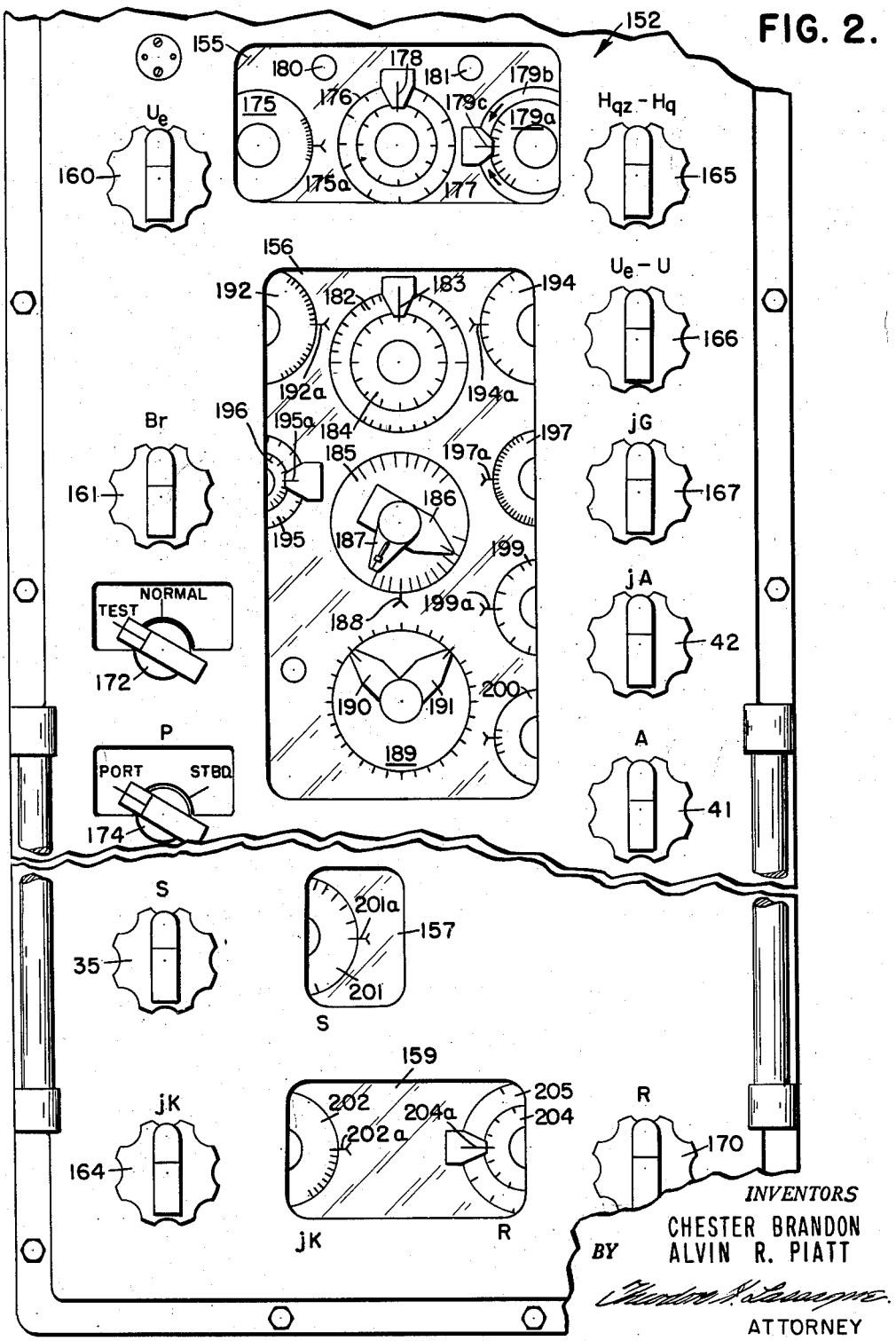
FIGURE 2 is a front view of the instrument panel of the computer.

Section III is located physically in the lower front portion of the computer housing, as seen in FIGURE 2. It is shown in exploded schematic form in FIGURES 9a, 9b and 9c, which may be used as a unit by alining the correspondingly lettered broken shafts. The section is shown in functional schematic form in FIGURE 10, which may be similarly used with the Section II and IV showings of FIGS. 8a, 8b and 12.

Section III receives values proportional to $T_a'$ as a displacement from Section IV through a link 401, feeding a function generating mechanism 113 described subsequently. Values of $U_f$ are forwarded from servo loop 89 through coupling 304 to Section IV. Section III furnishes to Section II values of $S_f$ as the output of integrator 20, and values of S as the output of integrator 30. Section II returns to Section III from differential 64 corrected values representing $S \cos A + S_f \cos D$, applying them as a disk drive to integrator 62.

In addition to these interchanges of data between sections, Section III receives additional inputs from other sources. The torpedo correction factor $jk$ is inserted manually through handcrank 164 and coupling 301.

Target speed S may be inserted manually through handcrank 35 and coupling 311, which actuates an associated switch 312. It is computed by other equipment on own ship, received in servo loop 33 through a line 313 to control transformer 313a. Range values are inserted manually through a handcrank 170 and a coupling 314, which has a switch 315 associated therewith. Range values are also received as electrical signals from other equipment on board own ship through input lines 316 and 317.

The values of target speed S inserted electrically through line 313 and control transformer 313a, are strengthened by the servo loop 33 and displayed on target speed dial 201. This value, plus values added manually through handcrank 35 and coupling 311 with associated switch 312 is forwarded to the rack and pinion 32 of integrator 30. Rack and pinion 32 converts the rotational values to a displacement of the ball carriage. The output of integrator 30 is then proportional to S and is forwarded to Section II as described above. A friction clutch 34a is provided in the servo loop, and a limit stop 325 with associated switch 325a is provided to control the range within which values are transmitted to the rack and pinion 32. The path from coupling 311 and switch 312 is through broken shaft A—A', and the path from servo motor 34 is through the broken shaft E—E' to gearing 162b, where the values combine and are returned through shaft D'—D to the target speed dial 201 for display, and to the rack and pinion 32 through which integrator 30 is controlled.

Within Section III is located the correction point for the hypothetical value $S_f$, at the ball carriage of integrator 20, and the balancing point for $T_a$, at linkage differential 80. Solution for the latter provides data for correcting the former, completing the computation cycle. The time motor 21 furnishes a constant speed drive through shaft C'—C to the disks of integrators 20, 30, 58, 86 and 116; in addition it feeds differential 120 in the biased integrator loop 114. The path to integrators 20 and 30 is through the broken shaft C'—C, as is that to integrator 86. From the gearing associated with integrator 86 the drive is returned through broken shaft H—H' to differential 120, and to integrator 58, and through broken shaft U—U' to integrator 116.

The output of integrator 20 is a corrected value of the hypothetical value $S_f$, and is inserted in Section II through broken shafts F—F' and T—T'. This $S_f$ value is also inserted as a disk drive in integrator 84 through a path from the cylinder 74 of integrator 20 through broken shafts F—F' and T—T'. To arrive at the corrected $S_f$ values, it is first necessary to balance linkage differential 80. To obtain the computed $T_a$ value, we return to differential 51, one side of which receives R as the output of servo loop 52. The values of data developed in the servo loop 52 include the results of inputs supplied electrically and manually. Electrical signals are supplied from other equipment on own ship through line 316 to control transformer 319 at 72,000 yards per turn, and through line 317 to control transformer 320, at 2000 yards per turn. The rotors of these control transformers are positioned by the servo motor 54 through broken shaft BB'—BB, and the friction drive 321. From friction drive 321, the path to control transformer 319 is through broken shaft O'—O, by which cam and switch 324 controlling servo motor 54 is actuated, returning thru broken shaft M—M', and thence thru Y—Y'. The path from friction drive 321 to control transformer 320 is through intermediate gearing 320a. The loop outputs are combined with values entered manually through handcrank 170 and coupling 314, actuating switch 315, and passing thru broken shaft R—R'. The outputs of the control transformers 319 and 320 are then fed back electrically through amplifier 54a to control the servo motor directly. The strengthened output of motor 54 is displayed on the annular range dials 204 and 205. The transmissive path to dial 204 is thru the broken shafts BB'—BB and N'—N. The path to dial 205 is thru broken shafts BB'—BB to N'—N, thence thru shaft P'—P. It is also forwarded from the friction drive 321 thru broken shaft O'—O, and returns on broken shafts M—M' and AA—AA', returning again thru broken shafts Z'—Z to the limit stop 322, and thence to the rack and pinion 56 which directly controls the ball carriage displacement of integrator 58. The output of integrator 58 is then applied to one side of the differential 51, thru broken shaft X—X'.

The other side of differential 51 receives R from integrator 62 when a balance has been obtained. It will be recalled that by Equation 5 above, R is equal to $T_a$ $$(S \cos A + S_f \cos D)$$

and that the quantity in parenthesis was received for insertion in integrator 62 as a disk drive from Section II through appropriate gearing. Hence, when a balanced output has been obtained from differential 51, the displacement of ball carriage 65 of integrator 62 will be proportional to $T_a$. $T_a$ is delivered as a rotational output from differential 51 to rack and pinion 51a, and is applied to three portions of the computer. It is first returned as a ball carriage displacement to integrator 62, controlling switch 327. It is applied as a ball carriage displacement through a link 329 to integrator 84. It is also applied directly to the differential linkage 80. Simultaneously, differential linkage 80 receives, through a roller 305, measured values of $T_a'$ obtained as a displacement of a link 401 from Section IV, including torpedo speed corrections as applied through handcrank 164, from the linkage function generating mechanism 113. This produces a corrected measured value proportional to $$\frac{T_a'}{1+jk}$$

Section III receives the values of torpedo speed correction $jk$ inserted through handcrank 164 and coupling 301 at ten percent per turn. The values are applied within the range permited by limit stop 302 to the torpedo speed correction dial 202 for display, and to the function generator 113, through the broken shafts G—G' and V—V', where $T_a'$ is divided by $1+jk$. The result $$\frac{T_a'}{1+jk}$$

is then inserted in the differential linkage 80 for comparison with the computed value of $T_a$.

When a proper solution of $T_a$ has been obtained, these values will match, and the output of differential linkage 80 may be used to position correctly the ball carriage 81 of the integrator 20. As explained above, this re-positioning is accomplished with the assistance of a biased integrator loop 114, so that no damage to the integrators will result when a balanced condition has been reached. The output of differential linkage 80 is applied through a link 80a to the ball carriage of integrator 116. The disk of the integrator is driven by the time motor 21, as explained above. The output of integrator 116 is returned through broken shaft W'—W to differential 120, which also receives an input from the time motor 21. The path from time motor 21 to the other input side of differential 120 is through broken shafts C'—C and H—H', as described above. The output from differential 120 is then taken through broken shaft J'—J and a rack and pinion 81a to the integrator 20. The ball carriage of integrator 20 has now been re-positioned to accord with all of the newly measured values pertinent to the solution of the problem.

It remains for Section III to supply to the Ballistics Section IV new values of $U_f$. As explained above, the servo loop 89 is employed to strengthen the values proportional to $U_f$ and to change the scale to one appropriate for use in traversing the table 96 in Section IV.

The output of integrator 84 is applied to differential 87 through a path including the broken shafts CC'—CC and I'—I. There is a direct output from differential 87 through the limit stop 88a to the rack and pinion 88, which positions the ball carriage of integrator 86. The output of differential 87 also reaches through the broken shaft K—K', the differential 91 in the servo loop 89. The differential 91 receives its other input from the servo motor 90, through the friction drive 90c and the broken shaft Q'—Q. The rotational value of $U_f$ is supplied through a coupling 304 to Section IV through take-off gearing 91a associated with the same input side of differential 91. From integrator 86 the path to differential 87 is substantially direct. All necessary values have now been supplied to Section IV in corrected form, based on a comparison of computed and measured values. A new computation cycle will again begin with the value of $S_f$ at integrator 20, and the computed values again compared with more accurate measured values from the scale model of Section IV, based on a closer approximation to the correct data.

SECTION IV

Section IV, located physically behind Sections II and III, is shown in exploded schematic form in FIGURE 11 and in functional schematic form in FIGURE 12. Other details of the physical embodiment are shown in FIGURES 3, 4, 11, 14, 15 and 16. The section receives as inputs $Br-Bur+D$, $Br-Bur+D+P$ and $U_f$. It supplies as outputs the values of U, the angle F and $T_a'$.

$Br-Bur+D$ is received through coupling 242, and $Br-Bur+D+P$ through a coupling 244, from Section II. $U_f$ is received from Section III through coupling 304. The value of U is furnished through coupling 206, and that of F through coupling 245, to Section II. $T_a'$ is furnished to Section III as the displacement of a link 401.

Changes in the value of $U_f$ cause a proportional movement of own ship's table carriage 96 and own ship's table 98. This corrects the simulation to scale of the actual spacing between own ship and target, or points 7' and 9' in FIGURE 13. The point 7' corresponds with the rotational center of own ship's table 98, as corrected for parallax. The point 9' corresponds to the rotational axis of target table 95, that is, the hollow shaft 425. The changes in $U_f$ are effected directly through the table traversing cable 97, which is joined to own ship's table and wound around the driving drum 406 and the idler drums 407a, 407b and 407c. Cable 97 is kept taut at all times by means of a spring 411 associated with the driving drum 406, the driving power to which is supplied by servo motor 90 in Section III, within the range permitted by limit stop 402. At either end of its range, one or the other of the switches 404 and 405, which control indicating lights on other equipment, not shown, is actuated.

The manner in which the values of $Br-Bur+D$ and of $Br-Bur+D+P$ are applied to own ship's table 98 will next be considered. Coupling 242, which receives $Br-Bur+D$ values from Section II, transmits them through suitable gearing 242a and 242b, to the $Br-Bur+D$ splined shaft 412. Similarly, coupling 244, which receives $Br-Bur+D+P$ values from Section II, transmits them through suitable gearing 244a to a $Br-Bur+D+P$ splined shaft 414. Splined shafts 412 and 414 are slidably engaged with, and drive, gears 417 and 419, respectively. These pinions are rotatably mounted on own ship's table carriage 96. They are arranged to produce rotation therein of the corresponding $Br-Bur+D$ gear 420 and the $Br-Bur+D+P$ gear 421, through intermediate gearing means 417a and 419a.

The slidable engagement of splined shafts 412 and 414, with pinions 417 and 419, respectively, permits own ship's table 98 to be freely traversable in response to changes in the value of U, while at the same time enabling the change of parallax factors at any time. The factor along the torpedo tube is called the "longitudinal parallax," while that normal to the torpedo tube is called "lateral parallax." These changes are effected without producing any movement of own ship's table carriage 96, which is restricted to traversal in a straight guide between the parallel guide rails, 408 and 409, engaged by supporting rollers 410a, 410b, 410c and 410d.

Gears 420 and 421 acting together introduce $$Br - Bur + D$$

Gear 421 acts to add parallax to the angular values inserted. Since the only difference between the values introduced through the gears 420 and 421 is the parallax P, it will be seen that a relative rotation or differential movement between these gears will be effected, which will shift the position of the cams relative to the rotational axis of these gears.

As seen in FIGURE 16, gear 421 is provided with a central cup-shaped portion 421a formed integrally with a hollow shaft portion 421b. The central cup-shaped portion 421a receives rotatably therein a corresponding annular portion 420a formed integrally with gear 420. A cam table crank shaft 441, with which is formed integrally the crank arm 432, is inserted through anti-friction bearings 442, mounted in the center cup-shaped portion 420a of gear 420, and rotatably through the hollow shaft 421b associated with gear 421. When the elements have been properly zeroed, a clamp 421c disposed about the bottom of the hollow shaft 421b, is tightened to lock the latter to the crank shaft 441. The hollow shaft 421b is itself mounted in anti-friction bearings 444 secured to own ship's table carriage 96.

Rotation of the $Br - Bur + D + P$ gear 421 relative to gear 420 operates through a cam-positioning crank shaft 441, the crank arm 432 and a roller 434, acting in a slot 435 formed in a plate 436, to effect movement thereof within keystone guideways 437 formed in the target table 98. This provides the correction necessary for lateral parallax, which may then be read on a lateral parallax scale 450. When the parallax knob 174 is shifted from port to starboard, or vice versa, there will be a 90 degree reversal of the direction in which the parallax correction must be applied. This correction is obtained automatically by the resulting shift of the gear 421 relative to the gear 420. Longitudinal parallax, which is a constant of the particular installation, is inserted by shifting own ship's table carriage 96 in its position relative to gear 420 by means of parallel slots 439, and the value may be read on longitudinal parallax scale 451. After once being adjusted, the target table 98 is locked by means of screws 440, and need not be readjusted as long as the installation remains unchanged.

When a new value of $U_f$ is inserted in Section IV, the cable 106, simulating the actual path of the torpedo, will assume a new position. Cable 106, anchored at 106a, extends between ballistics cams 99 and 100 on own ship's table 96, around a portion of the curved surface of one or the other of these cams, and thence between two sensing rollers 427 carried by a guide arm 426 mounted on the shaft of a synchro transformer 109, forming a part of the target table 95. After passing between rollers 427, cable 106 is reaved over an idler pulley 429 carried by an arm 430 forming part of the target table, and extending from tube 425. The cable is then returned thru a cable aperture 427a in synchro guide arm 426 and over a second idler pulley 431, which feeds it coaxially into the tube 425, thus representing physically the point 9'. The cable is then directed onto a takeup reel 445.

When the direction of the cable 106 changes, in response to whatever factors have varied, cable pressure against the rollers 427 will turn the control arm of transformer 109, initiating an error signal therein, causing the entire target table 98 to rotate about the axis of hollow shaft 425 within an arcuate slot 446 formed in the mounting plate 447, which carries the entire assembly. The error signal in the control transformer 109 will be operative through the amplifier 449 and servo motor 107 in the servo loop 108 to restore the cable to a position in which it is passing directly over the point 9'. When the cable 106 is directly over the axis of hollow shaft 425, corresponding to point 9', the error signal will again be zero. Under normal conditions this combination is effective to simulate the angle F correctly within a few minutes of arc.

Whenever a change in the cable length occurs, whether due to traverse of table 96, rotation of the cams 99 and 100, or changes in parallax, these changes will be reflected in a change of the position and length of the cable 106. Positional changes will be corrected by the servo loop 108 and the new values of U will be returned to Section II and registered on dial 192. Similarly, the angle F and quantity $T_a'$ will be returned for use in arriving at a more closely approximate solution. After several cycles of computation, the solutions will be exact within the limits of accuracy of the observed data.

We claim:

1. In a computer, target table means mounted for reciprocal angular movement about an axis representing a first apex of a triangle, an angular value-registering device rotatably mounted on an axis representing a second apex of said triangle, and adjustable with reference to said first axis for registering a value proportional to a hypothetical first side of said triangle extending between said first and second axes, means for representing a path from a point referable directly to said second apex to a point intersecting said first apex of said triangle, comprising a longitudinally extending flexible, but non-extensible path-simulating cable connected at one end to said angular value-registering device, and cam means engaging said cable and compelling it to conform to a known curved path for a portion of its length, said cable extending normally for the remaining portion of its length along a line intersecting said first apex of a triangle, and being secured retractably relative thereto by means adapted to maintain said element under tension, and to register the length thereof between said second and first apices, means for measuring and registering values proportional to a second side of said triangle extending from said first apex to a third apex, means for registering values representing a third side of said triangle and extending between said third apex and said second apex, means for registering values proportional to a known angle between said second and third sides, means for determining when said path-simulating cable does not intersect said first axis exactly, and for utilizing positional differences therebetween to initiate error signals, means for utilizing said error signals to correct the values used in computing said first and second sides of said triangle, and means for utilizing said corrected values to re-compute the factors involved in determining a correct path.

2. In a computer, target table means mounted for reciprocal angular movement about an axis representing a first apex of a triangle, an angular value-registering device rotatably mounted on an axis representing a second apex of said triangle, and adjustable with reference to said first axis for registering a value proportional to a hypothetical first side of said triangle extending between said first and second axes, means for representing a path from a point referable directly to said second apex, to a point intersecting said first apex of said triangle, comprising a longitudinally extending flexible, but non-extensible path-simulating cable connected at one end to said angular value-registering device, and cam means engaging said cable and compelling it to conform to a known curved path for a portion of its length, said cable extending normally for the remaining portion of its length along a line intersecting said first apex of a triangle, and being secured retractably relative thereto, by means adapted to maintain said element under tension, and to register the length thereof between said second and first apices, means for measuring and registering values proportional to a second side of said triangle, extending from said first apex to a third apex, means for registering values representing a third side of said triangle and extending between said third apex and said second apex, means for registering values proportional to a known angle between said second and third sides, means for sensing mechanical positional deviations of said cable from a path intersecting said first axis, means for converting deviations so sensed mechanically into electrical error signals, and means for utilizing said error signals to restore said cable to a position intersecting said first axis, and for utilizing them to correct values used in computing said first and second sides of said triangle, and means for utilizing said corrected values to re-compute the factors involved in determining a correct path.

3. In a computer, target table means mounted for reciprocal angular movement about an axis representing a first apex of a triangle, an angular value-registering device rotatably mounted on an axis representing a second apex of said triangle, and adjustable with reference to said first axis for registering a value proportional to a hypothetical first side of said triangle extending between said first and second axes, means for representing a path from a point referable directly to said second apex, to a point intersecting said first apex of said triangle, comprising a longitudinally extending, flexible, but non-extensible path-simulating cable connected at one end to said angular value-registering device, and cam means engaging said cable and compelling it to conform to a known curved path for a portion of its length, said cable extending normally for the remaining portion of its length along a line intersecting said first apex of a triangle, and being secured retractably relative thereto, by means adapted to maintain said element under tension, and to register the length thereof between said second and first apices, means for measuring and registering values proportional to a second side of said triangle extending from said first apex to a third apex, means for registering values representing a third side of said triangle and extending between said third apex and said second apex, means for registering values proportional to a known angle between said second and third sides, means for sensing mechanically deviations of said cable from a position intersecting said first axis, comprising a control transformer mounted in said target table, and having a rotor shaft projecting axially thereof, a sensing arm fixed to said shaft and extending radially therefrom, a pair of rollers mounted on said sensing arm and disposed in engagement with opposite sides of said cable, a servo motor mounted on said target table, and connected to said control transformer, said servo motor being arranged to produce a corrective rotation of said target table in response to signals from said control transformer, initiated by variations in the position of said sensing arm.

4. In a computer, target table means mounted for reciprocal angular movement about an axis representing a first apex of a triangle, an angular value-registering device rotatably mounted on an axis representing a second apex of said triangle, and adjustable with reference to said first axis for registering a value proportional to a hypothetical first side of said triangle extending between said first and second axes, means for representing a path from a point referable directly to said second apex, to a point intersecting said first apex of said triangle, comprising a longitudinally extending, flexible, but non-extensible path-simulating cable connected at one end to said angular value-registering device, and cam means engaging said cable and compelling it to conform to a known curved path for a portion of its length, said cable extending normally for the remaining portion of its length along a line intersecting said first apex of a triangle, and being secured retractably relative thereto, by means adapted to maintain said element under tension, means for measuring and registering values proportional to a second side of said triangle extending from said first apex to a third apex, means for registering values representing a third side of said triangle and extending between said third apex and said second apex, means for registering values proportional to a known angle between said second and third sides, means for determining when said cable does not intersect said first axis exactly, and for utilizing positional differences therebetween to initiate error signals, means for utilizing said error signals to correct hypothetical and assumed values used in computing said first and second sides of said triangle, means associated with said target table for registering the length of said cable between its point of anchorage to said angle value-registering device, and said first apex when said cable is extending directly over said first axis, and means for utilizing said corrected values to recompute the factors involved in determining a correct path.

5. In a computer, target table means mounted for reciprocal angular movement about an axis representing a first apex of a triangle, an angular value-registering device rotatably mounted on an axis representing a second apex of said triangle, and adjustable with reference to said first axis for registering a value proportional to a hypothetical first side of said triangle extending between said first and second axes, means for representing a path from a point referable directly to said second apex, to a point intersecting said first apex of said triangle, comprising a longitudinally extending, flexible, but non-extensible path-simulating cable connected at one end to said angular value-registering device, and cam means engaging said cable and compelling it to conform to a known curved path for a portion of its length, means effective through rotation of said table to displace said cam means to introduce parallax values corresponding to the angle between the axis of own ship and the heading of a torpedo projector to port, means effective through differential rotation of own ship's table to displace said cams for introducing parallax values corresponding to the angle between the axis of own ship and the heading of a torpedo projector to starboard, said cable extending normally after leaving engagement with said cam means for the remaining portion of its length along a line intersecting said first apex of a triangle, and being secured retractably relative thereto, by means adapted to maintain said element under tension, and to register the length thereof between said second and first apices, means for measuring and registering values proportional to a second side of said triangle extending from said first apex to a third apex, means for registering values representing a third side of said triangle, and extending between said third apex and said second apex, means for registering values proportional to a known angle between said second and third sides, means for sensing mechanical positional deviations of said cable from a path intersecting said first axis means for converting deviations so sensed mechanically into electrical error signals, and means for utilizing said error signals to restore said cable to a position intersecting said first axis and for utilizing them to correct values used in computing said first and second sides of said triangle, and means for utilizing said corrected values to re-compute the factors involved in determining a correct path means including comprising a path of gears mounted coaxially with said second apex of said triangle, means for displacing said cam means relative to said first apex to represent starboard parallax values for a projector directed to starboard means for introducing the differential rotation of said gears to introduce a corresponding parallax factor to port, mechanical sensing means adapted to produce a null signal from a control transformer associated with said target table when said cable passes directly of said first apex, and means associated with said target table for registering the length of said cable between its point of anchorage to said angular value-registering device, and said first apex, and means for using any positional discrepancy between said cable and said first axis to initiate correction of data upon which an answer is being computed by said device.

6. Apparatus for controlling the firing of a projectile such as a torpedo from own ship to intercept a target, including, means for providing signal indications representing the range between own ship and the target, means for providing signal indications representing target speed, means for providing signal indications representing a target angle formed by the range line and the direction of target movement and for converting these signal indications into signal indications representing trigonometric functions of the target angle, means including differential means for using the signal indications representing the target speed and the trigonometric functions to provide signal indications representing the speed of the projectile toward the target, and means including differential means for using the signal indications representing the range, projectile and target speed and the trigonometric functions to provide signal indications representing the time required for the projectile to intercept the target.

7. Apparatus as set forth in claim 6 in which means are included for inserting corrections into the signal indications representing the time for the projectile to intercept the target and for inserting such corrections in accordance wih such variables as sea temperature and the depth of the torpedo in the sea.

8. Apparatus for controlling the firing of a projectile such as a torpedo from own ship to intercept a target, including, means for providing signal indications representing a first distance along a line of sight between own ship and the target, means for providing signal indications representing a target angle between the line of sight and the direction of target movement, means for providing signal indications representing the speed at which the projectile moves toward the target, means for using the signal indications representing the distance, the projectile speed and the target angle to provide first signal indications representing the time required for the projectile to intercept the target, means for using the signal indications representing the projectile speed and the time to provide signal indications representing a second distance between own ship and the position at which the projectile should intercept the target, means for simulating the relationship between own ship and the target in accordance with the last mentioned signal indications and for simulating the projectile course to provide second signal indications representing the simulated time for the projectile to intercept the target, and means for adjusting such signal indications as those representing the second distance in accordance with any differences between the first and second signal indications representing time.

9. Apparatus for controlling the firing of a projectile such as a torpedo from own ship to intercept a target, including, means including a movable member and including a pivotable member disposed on the movable member for simulating the relative positions of own ship and the target and for simulating the course of the projectile from own ship toward the target, means for using the simulating means to provide signal indications representing the angle between the simulated course of the projectile and a straight-line course between own ship and the position at which the projectile should intercept the target, means for providing signal indications representing a target angle defined by the direction of target movement and a line of sound between own ship and the target, means for providing signal indications representing the relative bearing angle between the direction of own ship's course and the line of sound, and means including differential means for using the signal indications representing the different angles to provide signal indications for insertion into the projectile and representing the angle through which the projectile must be turned after being fired in order to intercept the target.

10. Apparatus for controlling the firing of a projectile such as a torpedo from own ship to intercept a target, including, means for providing signal indications representing a first angle defined by the direction of own ship's course and a line of sound between own ship and the target, means for providing signal indications representing the speed of the target, means for providing signal indications representing a second angle defined by the target course and the line of sound, means including differential means for using the signal indications representing the target speed and the target angle to provide signal indications representing a third angle defined by the line of sound and a line between own ship and the position at which the projectile should intercept the target, means including a first member movable in a first direction for simulating the position of own ship and the position of target interception and including a second member pivotable about an axis on the first member for using these simulated positions to provide signal indications representing a fourth angle defined by the actual course required for the projectile to reach the target and a line between own ship and the position of target interception, and means including differential means for using the signal indications representing the first, third and fourth angles to provide signal indications for insertion into the projectile to represent the angle through which the projectile has to turn after being launched in order to intercept the target.

11. Apparatus for controlling the firing of a projectile such as a torpedo from own ship to intercept a target, including, means for providing signal indications representing the distance of a line of sound between own ship and the target, means for providing signal indications representing a first angle defined by the line of sound and the direction of the target course, means for providing signal indications representing target speed, means including differential means for using the signal indications representing target speed and the first angle to provide signal indications representing a second angle defined by the line of sound and a line between own ship and the position at which the projectile should intercept the target, means including differential means for using the signal indications representing the distance of the line of sound and the first and second angles to provide signal indications representing a first time at which the projectile should reach the target after being fired from own ship, means for simulating the position of own ship and the position of target interception and for simulating the course of the projectile toward the target to provide signal indications representing a second time at which the projectile should intercept the target after being fired from own ship, and means for adjusting the signal indications representing the second angle in accordance with any differences between the first and second times.

12. Apparatus for controlling the firing of a projectile such as a torpedo from own ship to intercept a target, including, means for providing signal indications representing a target angle defined by the direction of target movement and a line of sound between own ship and the target, means for providing signal indications representing the target speed, means including first differential means for combining the signal indications representing the target speed and the target angle in a first particular relationship to provide signal indications representing a computed speed of the projectile, means including second differential means for combining the signal indications representing the target speed and the target angle in a second particular relationship to provide signal indications representing the time for the projectile to intercept the target after being fired from own ship, means including third differential means for combining the signal indications representing the computed projectile speed and the time for the projectile to reach the target to provide signal indications representing a computed distance between own ship and the position of target interception, and means for using the computed distance to simulate the relative positions of own ship and the position of target interception to provide a simulated path for the projectile in intercepting the target and to provide signal indications representing the simulated distance through which the projectile must travel in order to intercept the target.

13. Apparatus for controlling the firing of a projectile such as a torpedo from own ship to intercept a target, including, means for providing signal indications representing target speed, means for providing signal indications representing a target angle defined by the direction of target movement and a line of sound between own ship and the target, means including at least a first integrator for combining the signal indications representing target speed and target angle to provide signal indications representing computed projectile speed, means including at least a second integrator for combining the signal indications representing target speed and target angle to provide signal indications representing a computed time for the projectile to intercept the target after being fired, means including at least a third integrator for combining the signal indications representing the computed target speed and the computed time to provide signal indications representing the distance between own ship and the position at which the projectile should intercept the target, means for simulating the position of own ship and the position of target interception and for simulating the actual course of the projectile toward the target to provide signal indications representing a simulated time for the projectile to reach the target, and means for adjusting the signal indications representing the distance and the simulated positions of own ship and the target in accordance with any differences between the computed and simulated times.

14. Apparatus for controlling the firing of a projectile such as a torpedo from own ship to intercept a target, including, means for providing signal indications representing target speed, means for providing signal indications representing a target angle defined by the direction of target movement and a line of sound between own ship and the target, means including at least a first integrator and a first differential for combining the signal indications representing target speed and target angle in a first particular relationship to provide signal indications representing computed projectile speed, means including at least a second integrator and a second differential for combining the signal indications representing target speed and target angle in a second particular relationship to provide signal indications representing a computed time for the projectile to intercept the target after being fired, means including at least a third integrator and a differential for combining the signal indications representing the computed target speed and the computed time to provide signal indications representing the distance between own ship and the position of target interception, means for using the last mentioned signal indications to simulate the position of own ship and the position of target interception and to simulate the actual course of the projectile toward the target for the provision of signal indications representing a simulated time for the projectile to reach the target, means for adjusting the simulated time in accordance with such empirical factors as water depth and depth of projectile travel in the water, and means for adjusting the signal indications representing the distance and the simulated positions of own ship and the target in accordance with any differences between the computed and adjusted simulated times.

15. Apparatus as set forth in claim 14 in which the simulating means provide on a simulated basis signal indications representing the actual distance through which the projectile would have to travel in order to intercept the target.

16. Apparatus for controlling the firing of a projectile such as a torpedo from own ship to intercept a target, including, means for providing signal indications representing target speed, means for providing signal indications representing a first distance along a line of sound between own ship and the target, means for providing signal indications representing a first angle defined by the line of sound and the direction of target movement and for converting these signal indications into signal indications representing trigonometric functions of the first angle, means including an integrator and differential means for combining the signals representing target speed and the first trigonometric functions to provide signal indications representing projectile speed and a second angle defined by the line of sound and a line between own ship and the position at which the projectile should intercept the target and for converting the signal indications representing the second angle into signal indications representing trigonometric functions of the angle, means including an integrator and differential means for combining the signal indications representing the target distance, the target and projectile speeds and the first and second trigonometric functions to provide signal indications representing a first time at which the projectile should intercept the target after being fired, and means including differential means for combining the signal indications representing target speed and the first time to provide signal indications representing a second distance between own ship and the position of target interception.

17. Apparatus as set forth in claim 16, including, means for using the signal indications representing the second angle and the second distance to provide a simulated positioning of own ship and the position of target interception and for using these positions to simulate the course of the projectile toward the target and to provide signal indications representing a second time for the projectile to intercept the target, and means for adjusting the signal indications representing such quantities as the second angle and the second distance in accordance with any differences between the signal indications representing the first and second times.

18. Apparatus for controlling the firing of a projectile such as a torpedo from own ship to intercept a target, including, means for providing signal indications representing a first angle defined by the direction of own ship's movement and a line of sound between own ship and the target, means for providing signal indications representing a second angle defined by the line of sound and the direction of target movement, means for providing signal indications representing the target speed, means including a first integrator for using the signal indications representing the target speed and the second angle to provide signal indications representing a third angle defined by the line of sound and the course that the projectile should follow to intercept the target, means including a second integrator for using the signal indications representing the second and third angles and the target speed to provide signal indications representing the distance between own ship and the position of target interception, means for using the signal indications representing the first and third angles and the last mentioned distance to simulate the position of own ship and the position of target interception and to simulate the course of the projectile toward the target, means including the simulating means for providing signal indications representing a fourth angle defined by the simulated course of the projectile and a line between own ship and the position of target interception, and means including differential means for combining the signal indications representing the first, third and fourth angles to provide signal indications representing a fifth angle for insertion into the projectile to control the angle through which the projectile should turn after being fired in order to intercept the target.

19. Apparatus for controlling the firing of a projectile such as a projectile from own ship to intercept a target, including, means for providing signal indications representing a first angle defined by the direction of own ship's movement and a line of sound between own ship and the target, means for providing signal indications representing a second angle defined by the direction of own ship's movement and the direction of projectile firing, means for providing signal indications representing a third angle defined by the line of sound and the direction of target movement and for converting these signal indications into signal indications representing trigonometric functions of the angle, means for providing signal indications representing the target speed, means including first differential means for using the signal indications representing the target speed and the trigonometric functions of the third angle in a first particular relationship to provide signal indications representing a fourth angle defined by the line of sound and a line between own ship and the position at which the projectile should intercept the target, means including second differential means for using the signal indications representing the target speed and the trigonometric functions of the third angle in a second particular relationship to provide signal indications representing the distance between own ship and the position of target interception, means including rotary members controlled by the signal indications representing the first, second and fourth angles and including linearly-movable members controlled by the signal indications representing the distance for simulating the position of own ship and the position of target interception, means including the simulating means for providing signal indications representing a fifth angle defined by the simulated path of the projectile and a line between own ship and the position of target interception, and means including differential means for combining the signal indications representing the first, second, fourth and fifth angles to provide signal indications representing a sixth angle for insertion into the projectile to control the angle through which the projectile should turn after firing.

20. Apparatus for controlling the firing of a projectile such as a torpedo from own ship to intercept a target, including, means for providing signal indications representing a first angle defined by the direction of own ship's movement and a line of sound between own ship and the target, means for providing signal indications representing target speed, means for providing signal indications representing a second angle defined by the line of sound and the direction of movement of the target, means for using the signal indications representing the target speed and the second angle to provide signal indications representing a third angle defined by the line of sound and a line between own ship's position and the position at which the projectile should intercept the target, means including differential means for combining the signal indications representing the first and third angles to provide a fourth angle, means for using the signal indications representing the target speed and the second and third angles for providing signal indications representing the distance between own ship and the position at which the projectile should intercept the target, a first rotary member, a second rotary member, means for rotating the first member in accordance with the signal indications representing the fourth angle, means for providing a relative adjustment in the distance between the first and second rotary members in accordance with the signal indications representing the distance between own ship and the position at which the projectile should strike the target, means disposed between the first and second rotary members for simulating the course of the projectile from own ship toward the target, and, means for adjusting the rotary position of the second member to provide for an interception of the target by the projectile along the simulated path.

21. Apparatus as set forth in claim 20, in which the means for simulating the path of the projectile include means for providing signal indications representing a fifth angle between the simulated path of the projectile and a line defined by own ship's position and the position at which the projectile should strike the target, and means including differential means for combining the signal indications representing the first, third and fifth angles to provide signal indications representing a sixth angle for insertion into the projectile to control the angle through which the projectile should turn after being fired.

22. Apparatus for controlling the firing of a projectile such as a torpedo from own ship to intercept a target, including, a first rotary member, a second rotary member, means for computing the distance between own ship and the position at which the projectile should strike the target, means for adjusting the relative distance between the first and second rotary members in accordance with the computed distance, means for computing an angle defined by the direction in which the projectile is fired and the line between own ship and the position at which the projectile should strike the target, means for rotating the first member through an angle related to the computed angle, means for simulating the path of the projectile, means associated with the first and second rotary members for simulating the position at which the projectile should intercept the target, and means for rotating the second member through an angle to produce an interception of the path-simulating means and the simulated target position.

23. Apparatus for controlling the firing of a projectile such as a torpedo from own ship to intercept a target, including, a first rotary member, a second rotary member, means for providing signal indications representing target speed and a first angle defined by the direction of target movement and a line of sound between own ship and the target, means for using the last mentioned signal indications to compute signal indications representing the speed of the projectile and the time required for the projectile to intercept the target, means for using the last mentioned signal indications to provide signal indications representing a computed distance between own ship and the position at which the projectile should intercept the target, means for providing signal indications representing a second angle defined by the direction of projectile firing and a line between own ship and the position at which the projectile should reach the target, means for adjusting the distance between the first and second rotary members in accordance with the signal indications representing the computed distance, means for providing a rotation of the first member in accordance with the signal indications representing the second angle, means extending between the first and second members and positioned in accordance with the positioning of the members for simulating the course of the projectile toward the target, means associated with the simulating means for indicating the position at which the projectile should intercept the target, means for rotating the second member to adjust the positioning of the path-simulating means for an intersection with the simulated position at which the projectile should intercept the target, means for using the simulated path of the projectile to provide signal indications representing a simulated time at which the projectile should intercept the target after being fired, and means for adjusting the signal indications representing the various quantities and the relative positions of the first and second rotary members in accordance with any differences between the computed and simulated times for the projectile to reach the target.

24. Apparatus for controlling the firing of a projectile such as a torpedo from own ship to intercept a target, including, a first rotary member, a second rotary member, means for providing a triangle having apices defined by own ship, the target and the position at which the projectile should intercept the target and for providing signals representing various parameters in the triangle including the distance between own ship and the position of target interception and including the angle defined by this distance and the line between own ship and the target, means for adjusting the relative positions between the first and second rotary members in accordance with the last mentioned signal indications representing the distance and the angle, means extending between the first and second rotary members for simulating the course of the missile from own ship to intercept the target, and means for adjusting the parameters of the triangle and the relative positions between the first and second rotary members to provide an intersection between the path-simulating means and the apex of the triangle representing the position of target interception.

25. Apparatus for controlling the firing of a projectile such as a torpedo from own ship to intercept a target, including, a first rotary member, a second rotary member, means for providing a triangle having apices defined by own ship, the target and the position at which the projectile should intercept the target and for providing signals representing various parameters in the triangle including the distance between own ship and the position of target interception and including the angle defined by this distance and the line between own ship and the target, means for adjusting the relative distance between the first and second rotary members in accordance with the signal indications representing the distance, means for adjusting the relative angular positions of the first and second rotary members in accordance with the signal indications representing the angle, means extending between the first and second rotary members for simulating the course of the projectile from own ship to intercept the target, means for simulating the triangular apex defined by the position at which the projectile should intercept the target, means including an error detector for providing signal indications representing any differences in positioning between the last-menitoned triangular apex and the simulated path of the projectile, and means for adjusting the relative rotary positions of the first and second members in accordance with the error signals to adjust the position of the path-simulating means in a direction for reducing the intensity of the error signal.

26. Apparatus for controlling the firing of a projectile such as a torpedo from own ship to intercept a target, including, a first rotary member, a second rotary member, a cam movable with the first rotary member and having a shape for simulating the initial trajectory of the projectile after leaving own ship, a cable extending from the first rotary member around the cam to the second rotary member to simulate the trajectory of the projectile to a position intersecting the target, means for providing signal indications representing target speed and a first angle defined by the direction of target movement and a line of sound between own ship and the target, means for using the last mentioned signal indications in a triangular relationship to provide signal indications representing the distance between own ship and the position of target interception and representing a second angle defined by the line of sound and a line between own ship and the position of target interception, means for providing a relative movement between the first and second rotary members to adjust the distance between these members in accordance with the signal indications representing the distance, means for providing a relative angular movement between the first and second members in accordance with the signal indications representing the second angle, means associated with the first and second rotary members for simulating the position at which the projectile should intercept the target, means including an error detector for producing an error signal representing the displacement of the cable from the last mentioned means, and means including a servo motor for driving the second rotary member in an angular direction for minimizing the error signal.

27. Apparatus for controlling the firing of a projectile such as a torpedo from own ship to intercept a target, including, means for providing signal indications representing a first angle defined by the direction of own ship's movement and a line of sound between own ship and the target, means for providing signal indications representing a second angle defined by the line of sound and the direction of target movement, means for providing signal indications representing the target speed, means including a first integrator for using the signal indications representing the target speed and the second angle to provide signal indications representing a third angle defined by the line of sound and the course that the projectile should follow to intercept the target after turning through a proper angle upon firing, means including a second integrator for using the signal indications representing the target speed and the first, second and third angles to provide signal indications representing a fourth angle defined by the course to be followed by the projectile and a line between own ship and the position of target interception, and means including differential means for combining the signal indications representing the different angles to provide signal indications representing a fifth angle for insertion into the projectile to control the angle through which the projectile should turn after being fired in order to intercept the target.

28. Apparatus for controlling the firing of a projectile such as a torpedo from own ship to intercept a target, including, means for providing signal indications representing a first angle defined by the line of sound between own ship and the target and the direction of projectile firing, means for providing signal indications representing a second angle defined by the line of sound and the direction of projectile travel after turning through a proper angle after firing, means for providing signal indications representing target speed and the direction of target movement, mechanical simulating means including variably positioned means responsive to the signal indications representing the first and second angles and to the signal indications representing target speed and the direction of target movement to simulate a proper course of the projectile to intercept the target, and means coupled to the simulating means for producing signal indications representing the angle through which the projectile should turn after firing in order to have the proper course for intercepting the target.

References Cited in the file of this patent

UNITED STATES PATENTS

| | | |
|---|---|---|
| 2,403,505 | Crooke | July 9, 1946 |
| 2,403,545 | Newell | July 9, 1946 |
| 2,420,017 | Sanders | May 6, 1947 |
| 2,438,522 | Smith | Mar. 30, 1948 |
| 2,557,401 | Agins et al. | June 19, 1951 |
| 2,600,159 | Ergen | June 10, 1952 |
| 2,689,083 | Hammond | Sept. 14, 1954 |
| 2,702,667 | Ford et al. | Feb. 22, 1955 |